(12) United States Patent
Cantrell et al.

(10) Patent No.: US 11,300,234 B2
(45) Date of Patent: Apr. 12, 2022

(54) FLUID FITTING

(71) Applicant: Eaton Intelligent Power Limited, Dublin (IE)

(72) Inventors: Christopher T. Cantrell, Jackson, MI (US); Gregory Kiernan, Grass Lake, MI (US); Ravi Soni, Okemos, MI (US); Eric R. Marx, Michigan Center, MI (US)

(73) Assignee: Eaton Intelligent Power Limited, Dublin (IE)

( * ) Notice: Subject to any disclaimer, the term of this patent is extended or adjusted under 35 U.S.C. 154(b) by 427 days.

(21) Appl. No.: 16/213,151

(22) Filed: Dec. 7, 2018

(65) Prior Publication Data

US 2019/0107231 A1    Apr. 11, 2019

Related U.S. Application Data

(63) Continuation-in-part of application No. 16/043,737, filed on Jul. 24, 2018.

(60) Provisional application No. 62/662,945, filed on Apr. 26, 2018, provisional application No. 62/647,640, filed on Mar. 24, 2018, provisional application No. 62/595,642, filed on Dec. 7, 2017, provisional application No. 62/541,903, filed on Aug. 7, 2017.

(51) Int. Cl.
*F16L 19/02* (2006.01)

(52) U.S. Cl.
CPC ....... *F16L 19/0206* (2013.01); *F16L 2201/10* (2013.01)

(58) Field of Classification Search
CPC ....... F16L 33/223; F16L 19/02; F16L 19/005; F16L 2201/10; F16L 2201/60; F16L 37/107; F16L 37/24; F16B 41/005; F16B 39/22
USPC ..................................... 285/92, 93
See application file for complete search history.

(56) References Cited

U.S. PATENT DOCUMENTS

| | | | | |
|---|---|---|---|---|
| 5,156,421 A | * | 10/1992 | Chauvel | F16L 19/005 285/92 |
| 5,186,501 A | * | 2/1993 | Mano | F16L 19/005 |
| 6,334,632 B1 | * | 1/2002 | Nishio | 285/92 |
| 7,544,086 B1 | * | 6/2009 | Wells | H01R 13/465 |
| 2007/0052234 A1 | * | 3/2007 | Breay | F16L 19/005 |
| 2011/0260450 A1 | * | 10/2011 | Imanishi | F16L 19/005 |
| 2012/0211974 A1 | * | 8/2012 | Richardson | 285/93 |
| 2014/0028013 A1 | | 1/2014 | Neiske | |
| 2014/0152001 A1 | | 6/2014 | Schippers et al. | |

(Continued)

FOREIGN PATENT DOCUMENTS

DE    202011004364 U1    5/2011

*Primary Examiner* — Zachary T Dragicevich
(74) *Attorney, Agent, or Firm* — Fishman Stewart PLLC

(57) ABSTRACT

A fluid fitting includes a nut, a sleeve, and a union. The union and the nut may include corresponding stops and corresponding markings. Corresponding stops and corresponding marking may engage with each other when the nut is sufficiently connected with the union. A method of connecting a fitting includes connecting a sleeve of the fitting with a nut of the fitting, connecting the nut with a union, rotating at least one of the nut and the union until a stop of the nut engages a stop of the union, restricting over torque via the stop of the nut and the stop of the union, and verifying a sufficient connection if first markings of the nut align with second markings of the union.

21 Claims, 24 Drawing Sheets

(56) References Cited

U.S. PATENT DOCUMENTS

2014/0265312 A1\* 9/2014 McAlister ............. F16L 19/005
2016/0003391 A1\* 1/2016 Okita ................... F16L 33/223
2016/0091126 A1   3/2016 Gibson et al.
2016/0215912 A1\* 7/2016 Fujii .................... F16L 19/005

\* cited by examiner

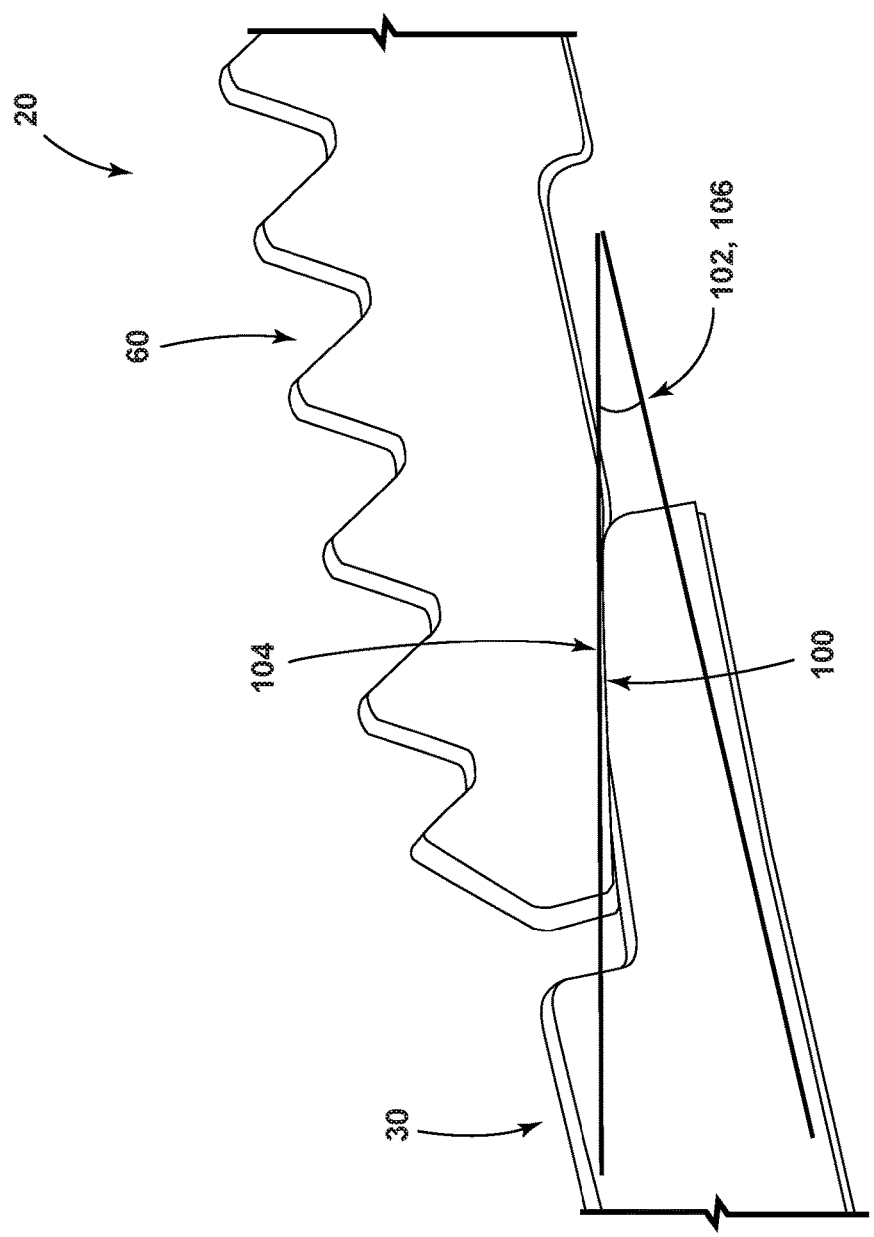

FLUID FITTING

CROSS-REFERENCE TO RELATED APPLICATION

This application claims the benefit of U.S. Provisional Patent Application Ser. No. 62/595,642, filed on Dec. 7, 2017, and is a continuation-in-part application of U.S. patent application Ser. No. 16/043,737 filed on Jul. 24, 2018, which claims the benefit of U.S. Provisional Patent Application Ser. No. 62/541,903, filed on Aug. 7, 2017, U.S. Provisional Patent Application Ser. No. 62/647,640, filed on Mar. 24, 2018, and U.S. Provisional Patent Application Ser. No. 62/662,945, filed on Apr. 26, 2018, the disclosures of which are all hereby incorporated herein by reference in their entireties.

TECHNICAL FIELD

The present disclosure generally relates to fittings, such as fluid fittings.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some fluid fittings, such as flareless fittings, it may be difficult to quickly determine if a sufficient connection has been made between a union, a nut, and/or a sleeve. For example, relative axial travel of a male and female flareless fitting between a minimum torque and a maximum torque may be about 0.0015 inches, and it may be difficult to ensure that a sufficient connection has been made, such as due to tolerance stack up. Using a torque wrench may involve an extended process.

There is a desire for solutions/options that minimize or eliminate one or more challenges or shortcomings of fluid fittings. The foregoing discussion is intended only to illustrate examples of the present field and should not be taken as a disavowal of scope.

SUMMARY

In embodiments, a fluid fitting may include a nut, a sleeve, and/or a union. The union and the nut may include corresponding stops and/or corresponding markings. Corresponding stops may engage with each other when the nut is sufficiently connected with the union. Corresponding marking may at least partially align with each other when the nut is sufficiently connected with the union. Corresponding markings may include a first marking of the nut and a second visual indicator of the union. One of the first visual indicator and the second visual indicator may include a greater circumferential extent than the other. The corresponding markings may include a plurality of black lines With embodiments, a method of connecting a fitting may include connecting a sleeve of the fitting with a nut of the fitting, connecting the nut with a union, rotating at least one of the nut and the union until a stop of the nut engages a stop of the union, restricting over torque via the stop of the nut and the stop of the union, and/or verifying a sufficient connection if first markings of the nut align with second markings of the union.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 10 is a perspective view generally illustrating portions of an embodiment of a fluid fitting according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents.

Figure 1A:
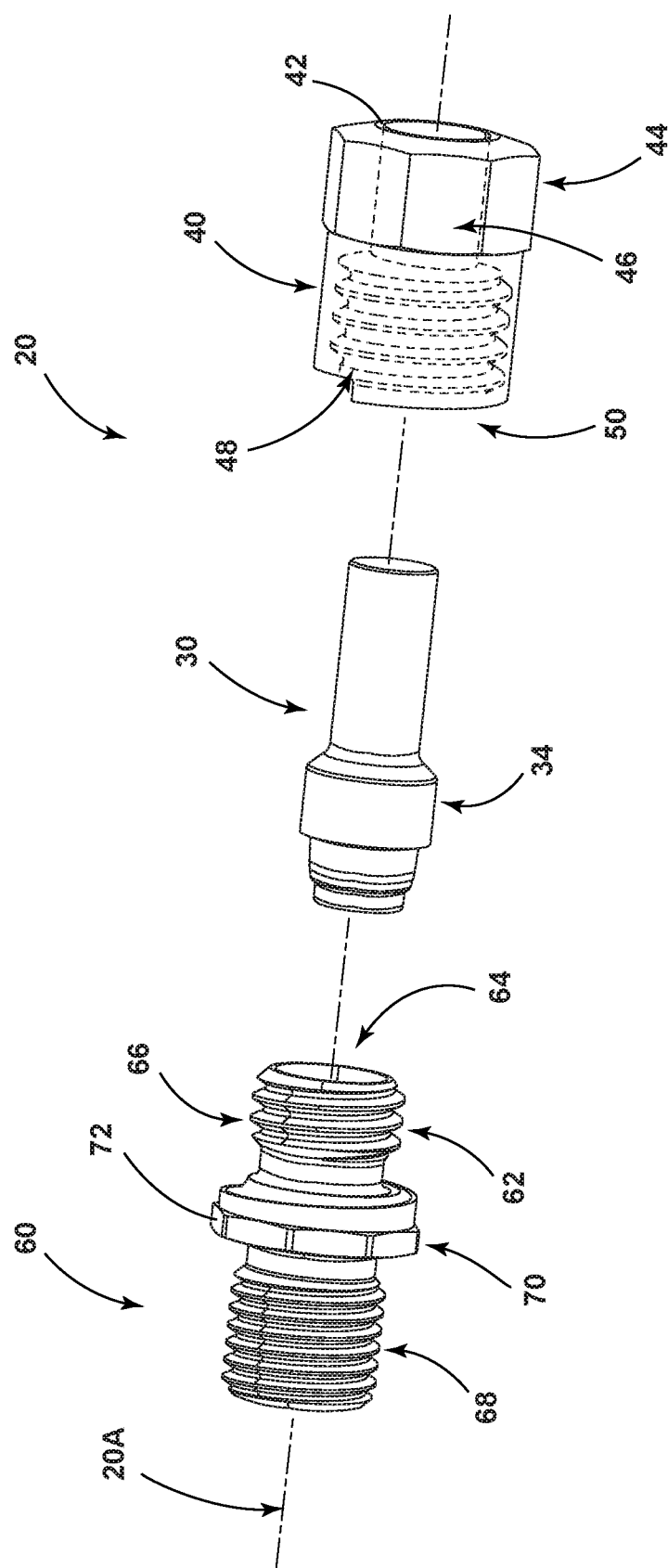
FIG. 1A is an exploded perspective view generally illustrating an embodiment of a fluid fitting according to teachings of the present disclosure.
Figure 1B:
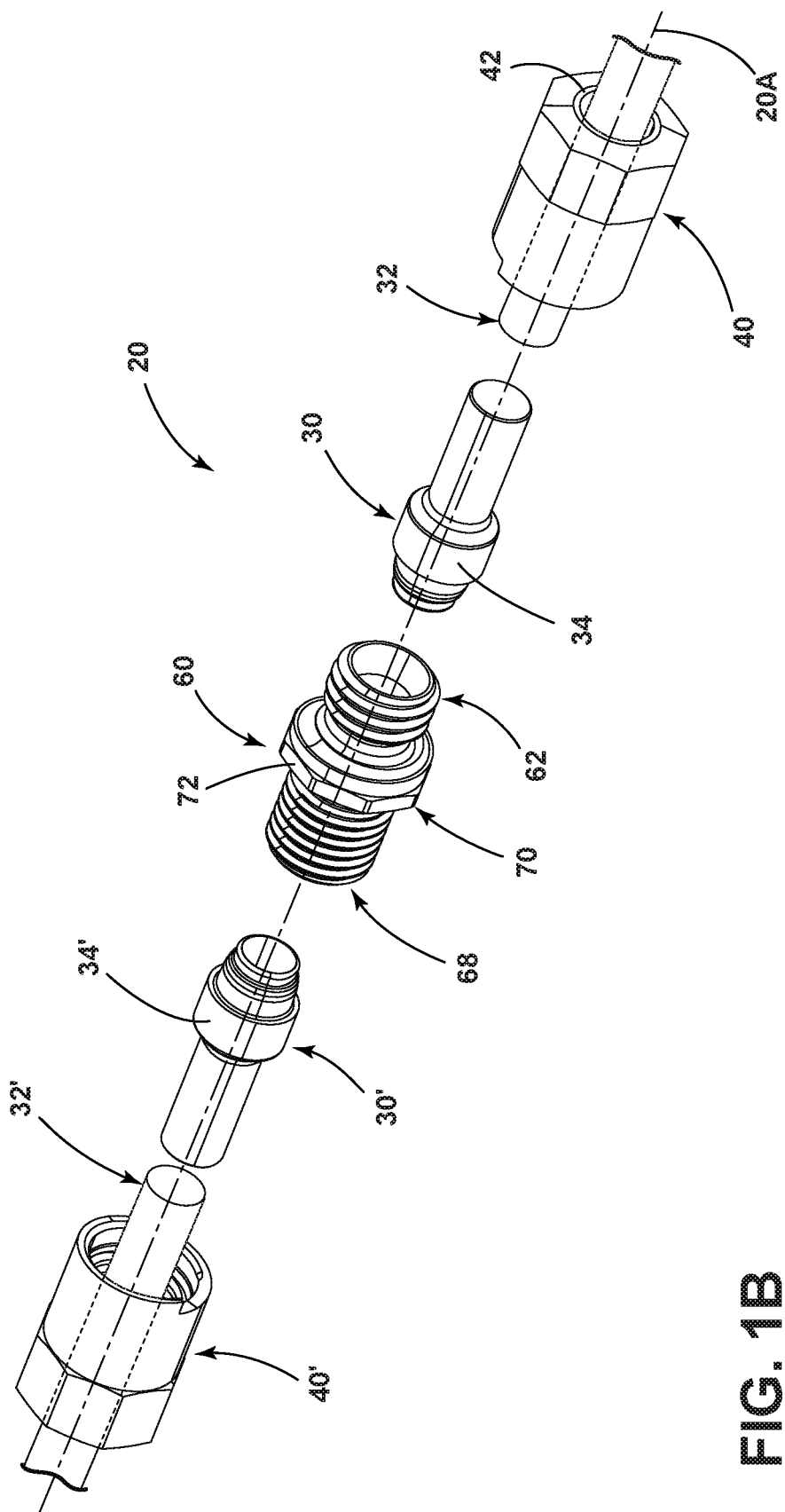
FIG. 1B is an exploded perspective view generally illustrating an embodiment of a fluid fitting according to teachings of the present disclosure.
Figure 2:
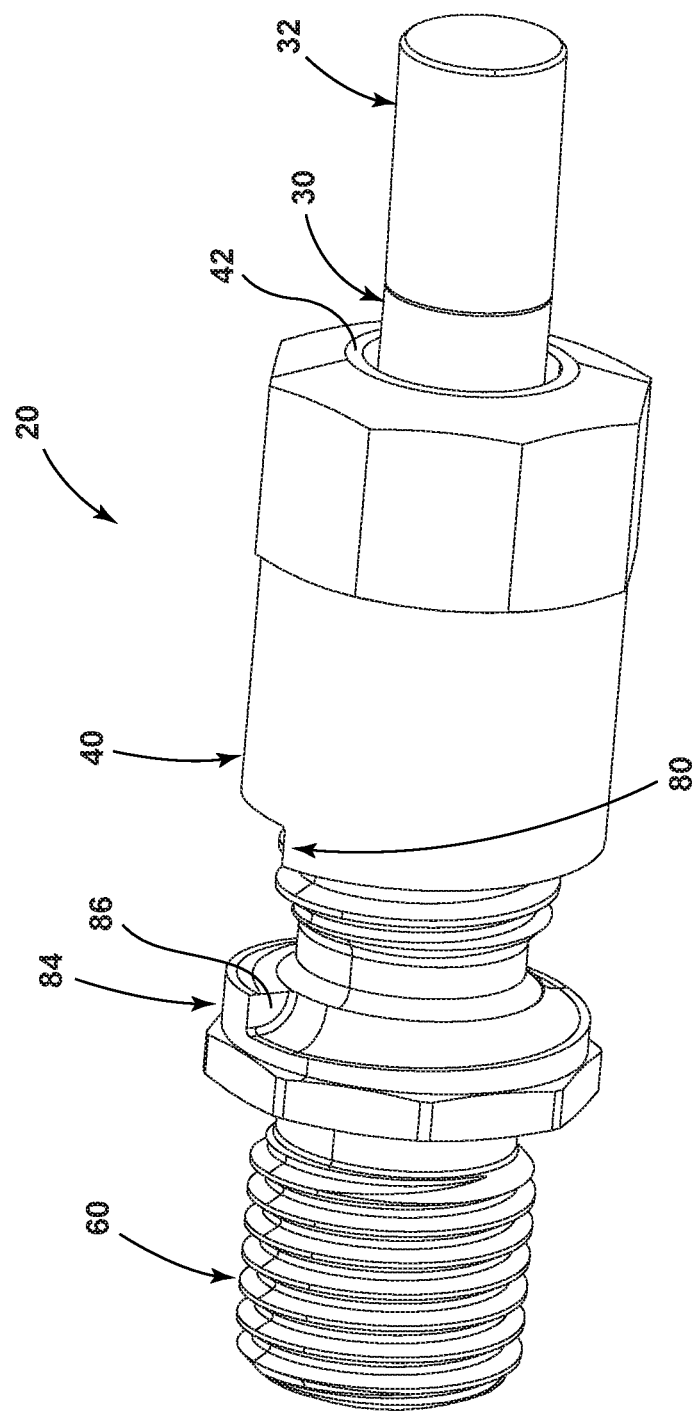
FIG. 2 is a perspective view generally illustrating an embodiment of a fluid fitting according to teachings of the present disclosure.

In embodiments, such as generally illustrated in FIGS. 1A, 1B, and 2, a fluid fitting 20 may include a sleeve 30, a nut 40, and/or a union 60. A fluid fitting 20 may be configured for connection with a fluid conduit 32, 32' such as a tube or a hose (see, e.g., FIG. 1B). For example and without limitation, a sleeve 30 may be connected with (e.g., inserted into) a fluid conduit 32 and/or a sleeve 30' may be connected with a fluid conduit 32'. A sleeve 30, 30' may include a flange 34, 34'. A fluid fitting 20 may include an axis 20A about which a nut 40 and/or a union 60 may rotate.

In embodiments, a nut 40 may be connected with a sleeve 30. For example and without limitation, a nut 40 may include an inner surface or flange 42 that may engage a flange 34 of a sleeve 30 such that axial movement of the nut 40 in at least one direction (e.g., toward the union 60) may cause axial movement of the sleeve 30. An inner surface or flange 42 may be disposed at or about a rear end 44 of the nut 40. A nut 40 may engage a sleeve 30 such that the nut 40 may rotate relative to the sleeve 30 and/or such that the sleeve 30 may be restricted from moving axially relative to the nut 40 in at least one direction (e.g., away from the union 60). A nut 40 may include one or more flat portions 46 (or other formations) that may, for example, be configured for engagement with a wrench and/or a hand of a user to cause rotation of the nut 40. A nut 40 may include inner threads 48 that may be disposed at or about a front end 50 of the nut 40.

With embodiments, a union 60 may include a first connection portion 62 that may be configured to at least partially receive a portion of a sleeve 30. Additionally or alternatively, a first connection portion 62 may be configured for connection with a nut 40. For example and without limitation, first connection portion 62 may include an aperture or recess 64 for at least partially receiving sleeve 30, and/or may include outer threads 66 that may be configured to engage inner threads 48 of the nut 40. A union 60 may include a second connection portion 68 that may be configured in the same or a similar manner as the first connection portion 62. For example and without limitation, as generally illustrated in FIG. 1B, the second connection portion 68 may be configured for connection with a second sleeve 30', a second fluid conduit 32' (e.g., via second sleeve 30'), and/or a second nut 40'.

With embodiments, a union 60 may include a shoulder 70 that may be disposed (e.g., axially) between the first connection portion 62 and the second connection portion 68. The shoulder 70 may include one or more flat portions 72 (or other formations) that may, for example, be configured for engagement with a wrench and/or a hand of a user. A shoulder 70 may include a greater outer diameter than the first connection portion 62 and/or the second connection portion 68.

In embodiments, a nut 40 may be connected to and/or disposed at least partially around a sleeve 30, and may then be connected to (e.g., screwed onto) a union 60. As a nut 40 connects with a union 60, the nut 40 may cause the sleeve 30 to move at least partially into an aperture 64 of the first connection portion 62 of the union 60, which may facilitate fluid communication between the sleeve 30, the fluid conduit 32, and/or the union 60.

Figure 3A:
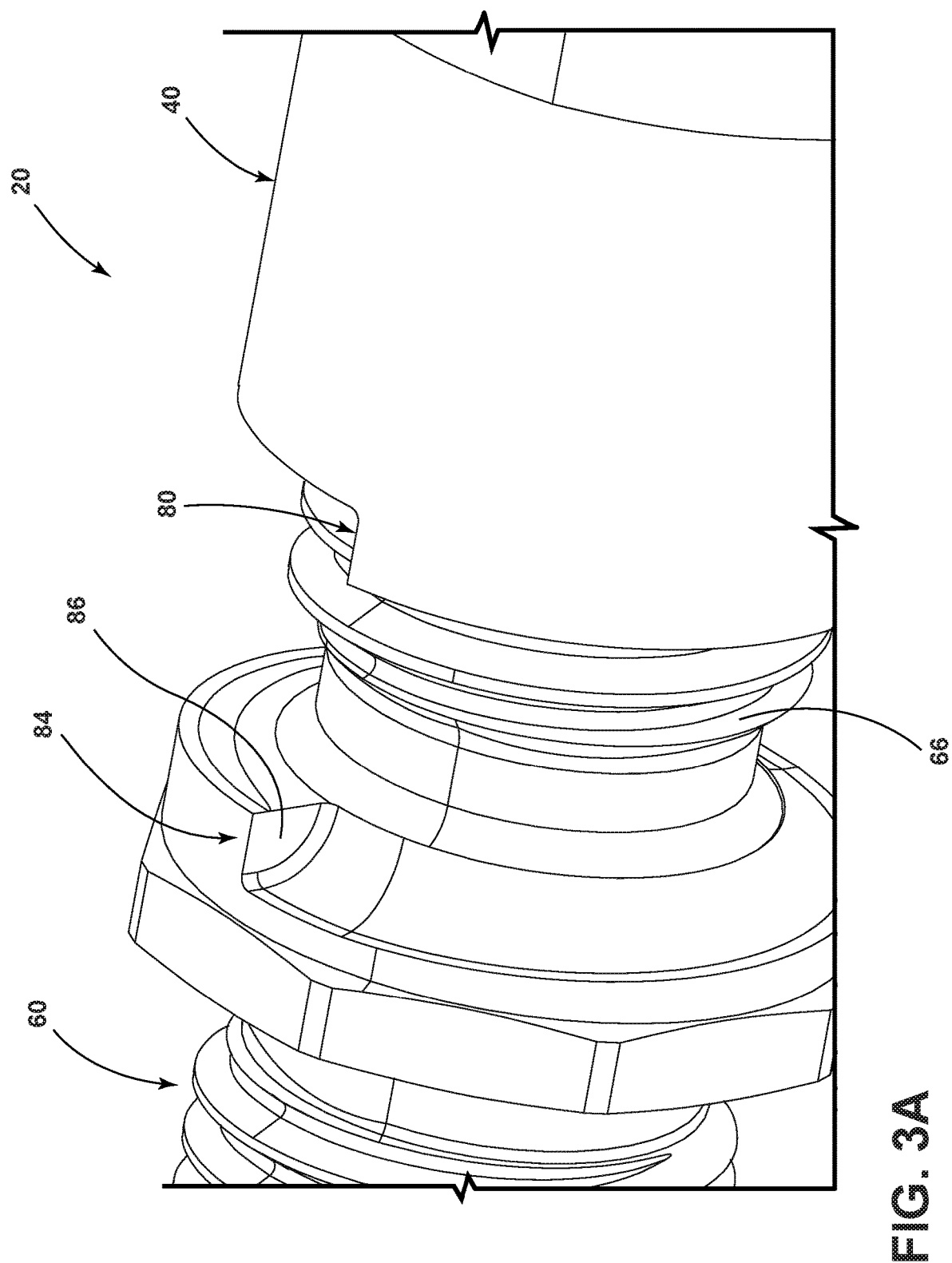
FIGS. 3A and 3B are perspective views generally illustrating portions of embodiments of fluid fittings according to teachings of the present disclosure.
Figure 3B:
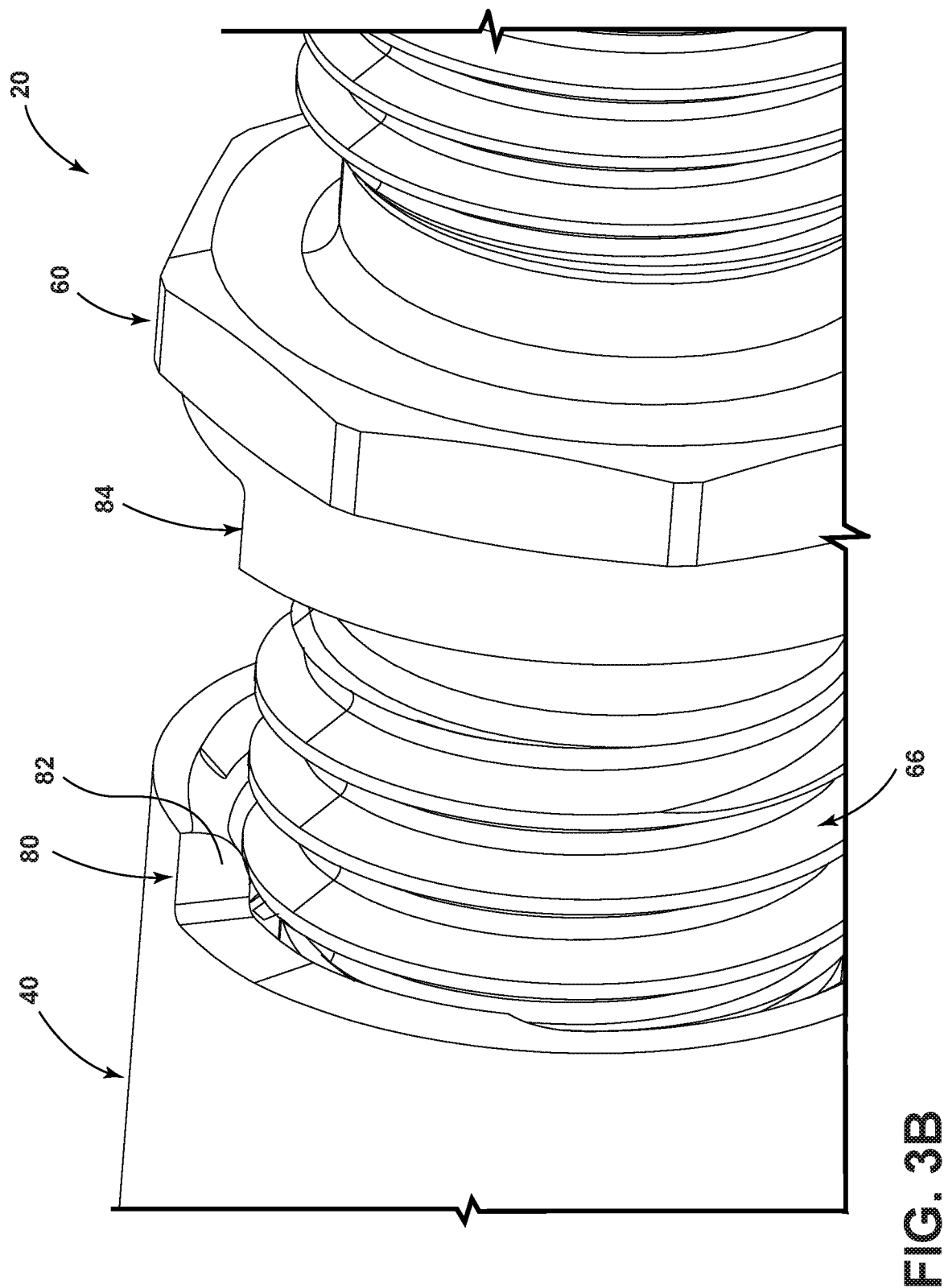

With embodiments, such as generally illustrated in FIGS. 2, 3A, and 3B, a nut 40 and/or a union 60 may include one or more stops (e.g., stops 80, 84) that may limit relative rotation between the nut 40 and the union 60 (e.g., limit a degree to which the nut 40 may be screwed onto the union 60) and/or may provide a visual indication of a sufficient connection between the nut 40 and the union 60. For example and without limitation, a nut 40 may include a first stop 80 and a union 60 may include a second stop 84. The first stop 80 may include a helical configuration and/or may include a first circumferential face 82. The second stop 84 may include a helical configuration that may correspond to the helical configuration of the first stop 80, and/or the second stop 84 may include a second circumferential face 86 that may correspond to the first circumferential face 82. For example and without limitation, the nut 40 may be screwed onto the union 60 until the first circumferential face 82 contacts or engages the second circumferential face 86. If the first circumferential face 82 is in contact with the second circumferential face 86, such contact may provide a tactile and/or visual indication, such as to a viewer/user/inspector, that a sufficient connection has been established.

Figure 4:
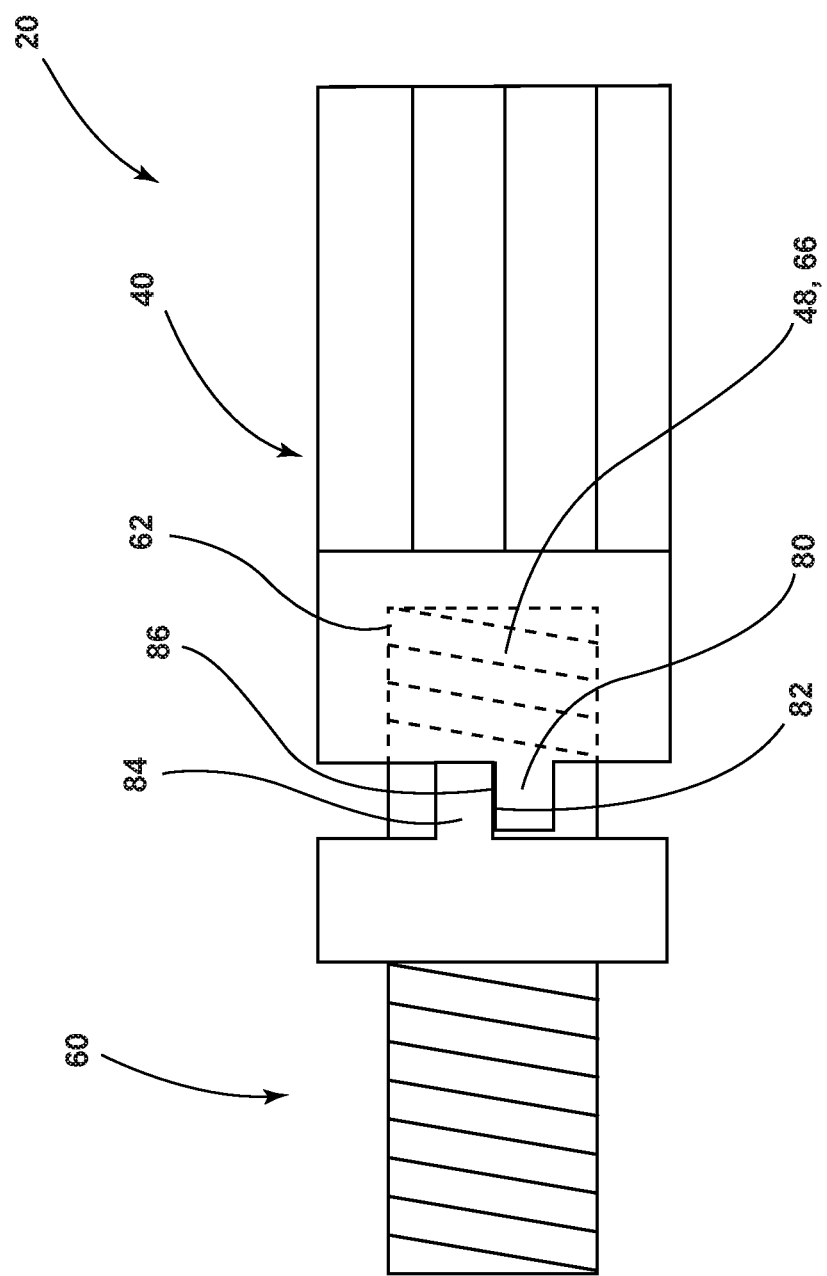
FIG. 4 is a side view generally illustrating an embodiment of a fluid fitting according to teachings of the present disclosure.

In embodiments, such as generally illustrated in FIG. 4, a first stop 80 and a second stop 84 may include corresponding finger configurations. For example and without configuration, a first stop 80 may extend in an axial direction toward the union 60, and a second stop 84 may extend in an axial direction toward nut 40. The first stop 80 (e.g., a first finger) may provide the first circumferential face 82, and the second stop 84 (e.g., a second finger) may provide the second circumferential face 86. Rotation of the nut 40 onto the union 60 may continue until the first stop 80 contacts or engages the second stop 84. A first stop 80 may be fixed to the nut 40, and/or a second stop 84 may be fixed to the union 60 such that an amount of torque that can be applied to the nut 40 and the union 60 while the first stop 80 and the second stop 84 are in contact or engagement may be limited (e.g., first stop 80 and second stop 84 may restrict and/or prevent further or over-torqueing).

Figure 5:
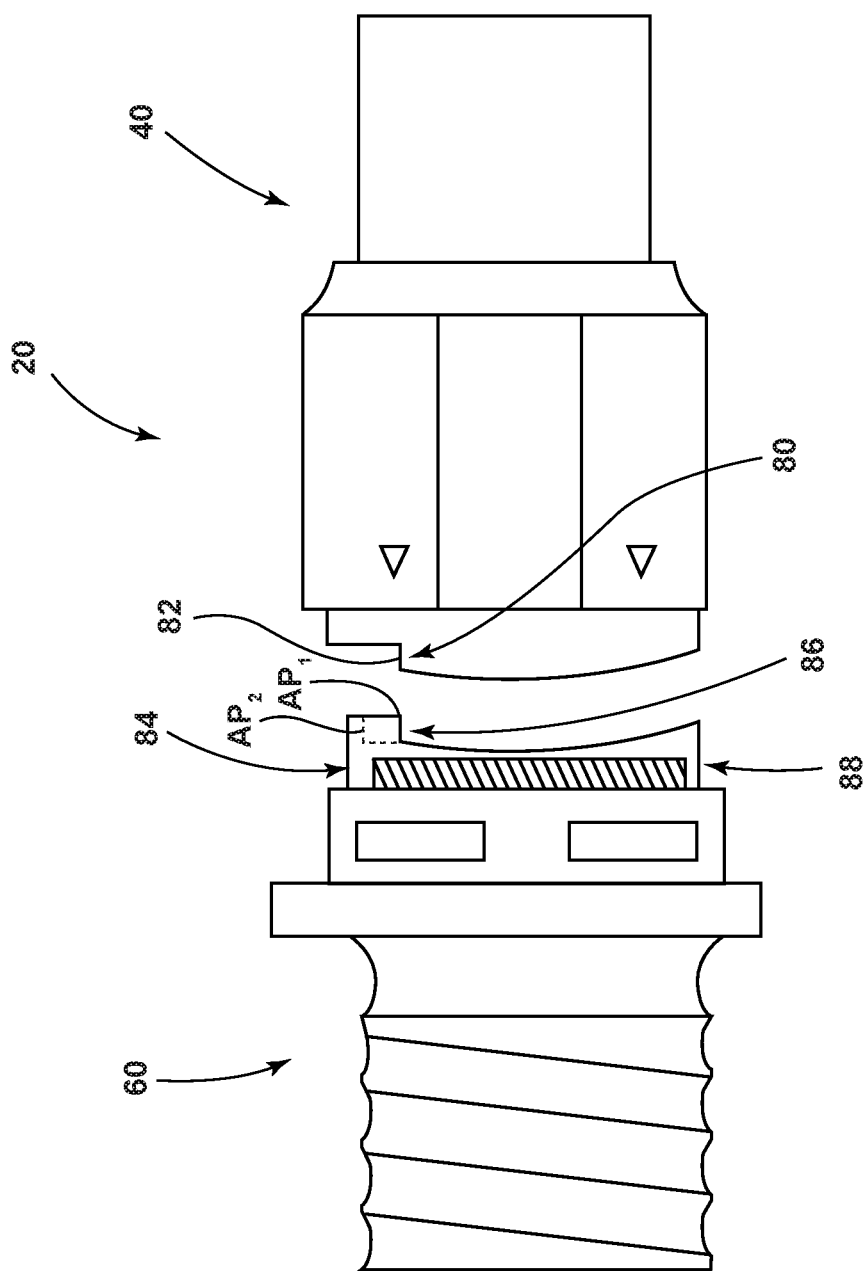
FIG. 5 is a side view generally illustrating an embodiment of a fluid fitting according to teachings of the present disclosure.

In embodiments, such as generally illustrated in FIG. 5, a first stop 80 may be configured to rotate relative to the nut 40, and/or a second stop 84 may be configured to rotate relative to the union 60 (e.g., one or both of the first and second stops 80, 84 may comprise a sliding stop). For example and without limitation, a second stop 84 may be provided by a stop ring 88 that may be press fit or interference fit onto the union 60. A stop ring 88 may be connected to the union 60 such that a minimum force or torque to cause rotation of stop ring 88 may be greater than a user is expected to provide without benefit of a mechanical advantage, such as via a wrench or other tool. If the nut 40 and the union 60 continue to be screwed together, after an initial engagement of the first stop 80 and the second stop 84 at a design position $AP_1$, with greater than the minimum force or torque (e.g., are over-torqued), the first stop 80 may cause rotation of the second stop 84 and the stop ring 88 from an initial angular position $AP_1$ to an over-torqued angular position $AP_2$. For future or subsequent connections of the nut 40 and the union 60, the nut 40 may be screwed onto the union 60 until the first stop 80 engages the second stop 84 (e.g., at the over-torqued position $AP_2$). Such a configuration may help ensure that with each connection of a fluid fitting 20, the nut 40 has been screwed onto the union 60 at least as far as the last connection and/or such that a minimum or desired axial force has been provided to the sleeve 30, the nut 40, and/or the union 60.

Figure 6:
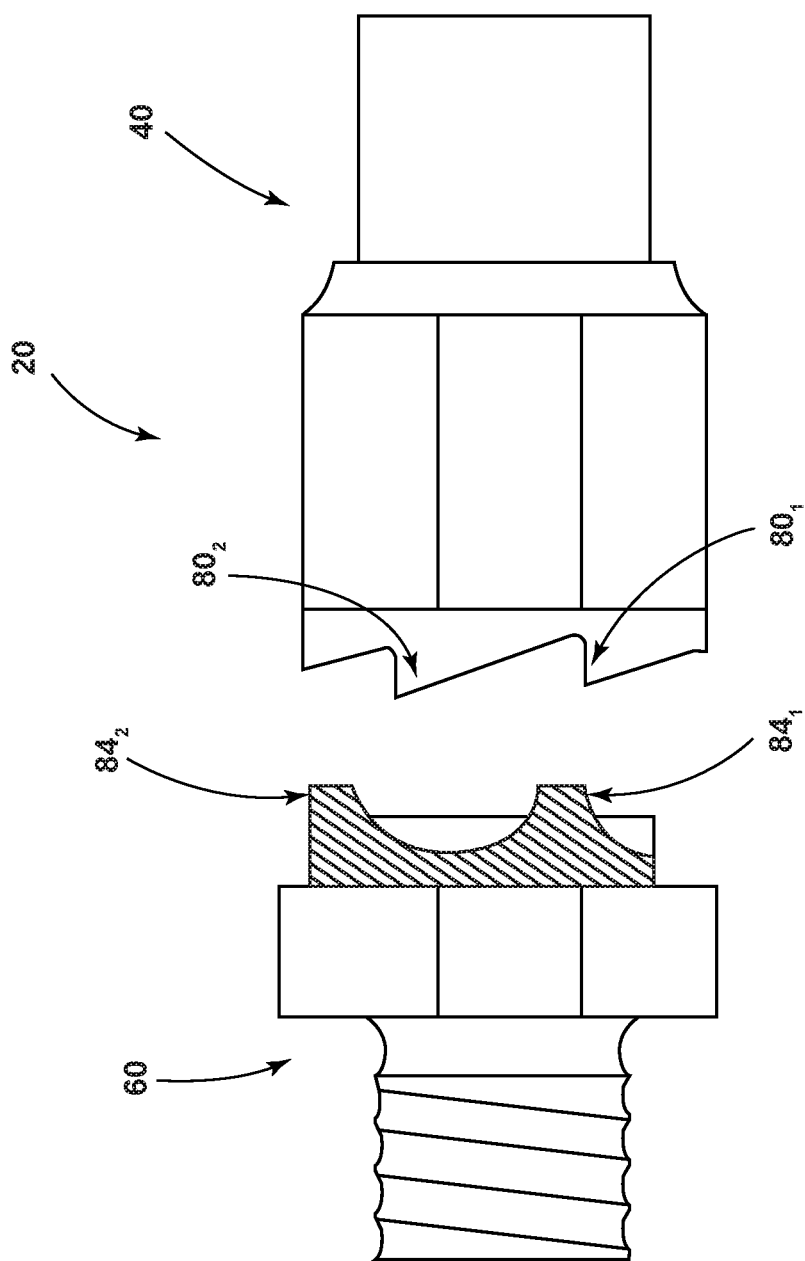
FIG. 6 is a side view generally illustrating an embodiment of a fluid fitting according to teachings of the present disclosure.

In embodiments, such as generally illustrated in FIG. 6, a nut 40 and/or a union 60 may include a plurality of stops, such as stops $80_1$, $80_2$ of the nut 40 and stops $84_1$, $84_2$ of the union 60. With embodiments, if a sufficient connection between a nut 40 and a union 60 is obtained, all of stops $80_1$, $80_2$ of nut 40 may be engaged with and/or in contact with all respective stops $84_1$, $84_2$ of union 60.

Figure 7:
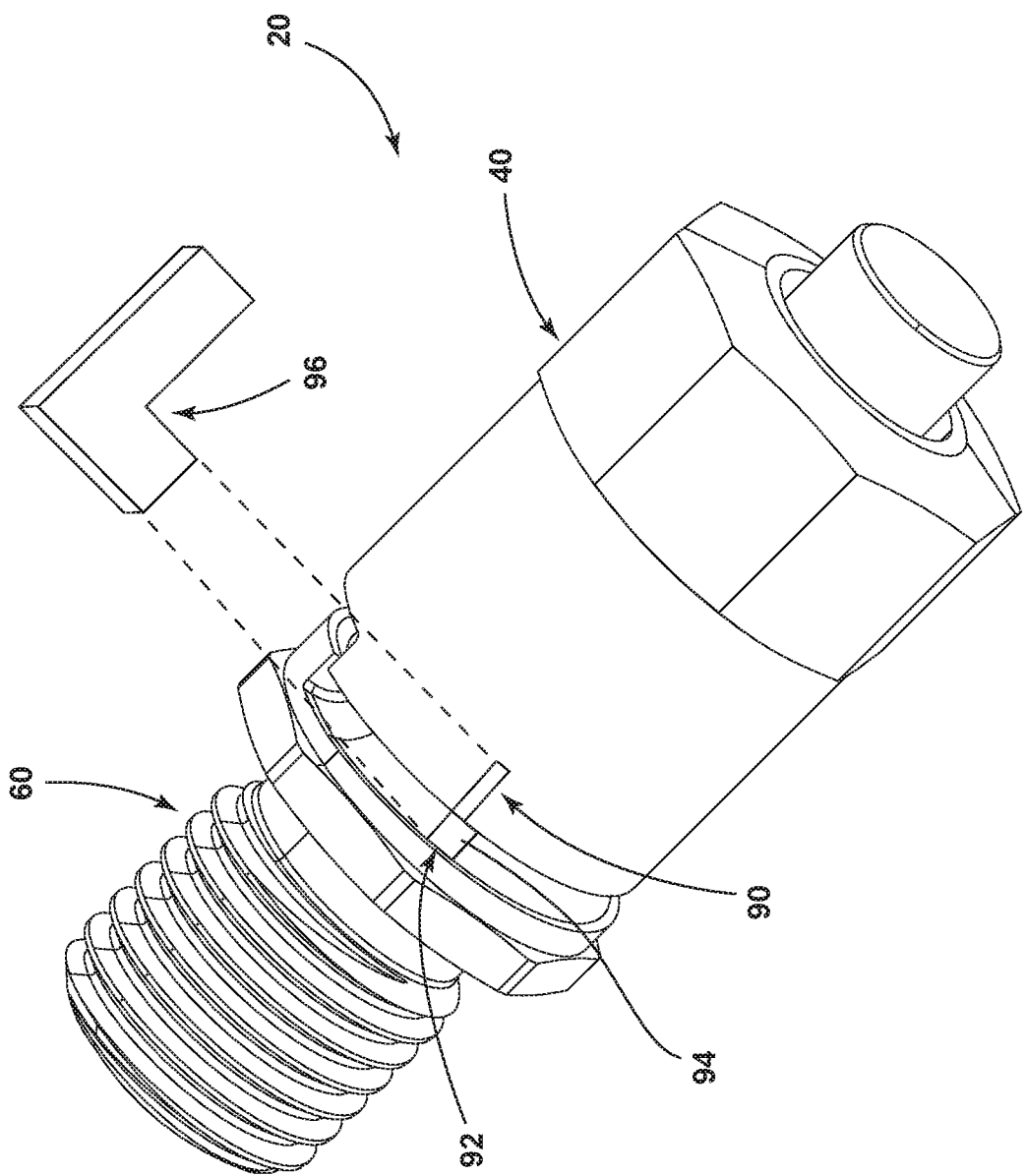
FIG. 7 is a perspective view generally illustrating embodiments of a fluid fitting and an electronic scanner according to teachings of the present disclosure.
Figure 7A:
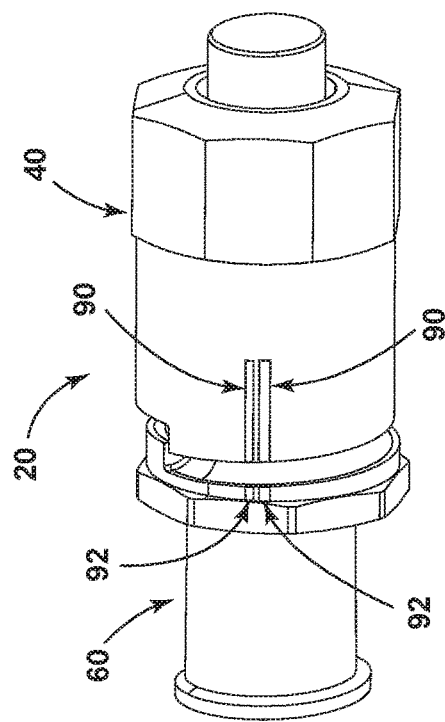
FIGS. 7A-7D are perspective views generally illustrating embodiments of fluid fittings according to teachings of the present disclosure.
Figure 7B:
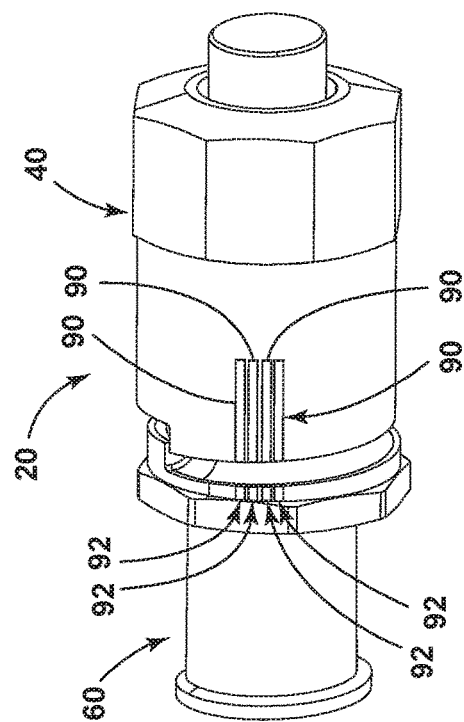
Figure 7C:
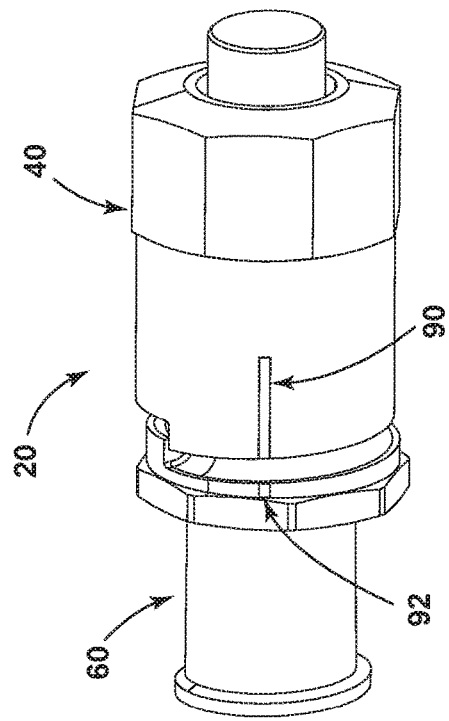
Figure 7D:
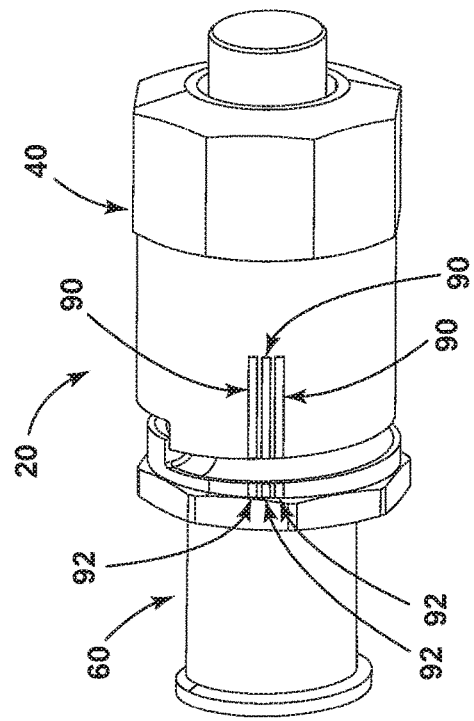
Figure 8:
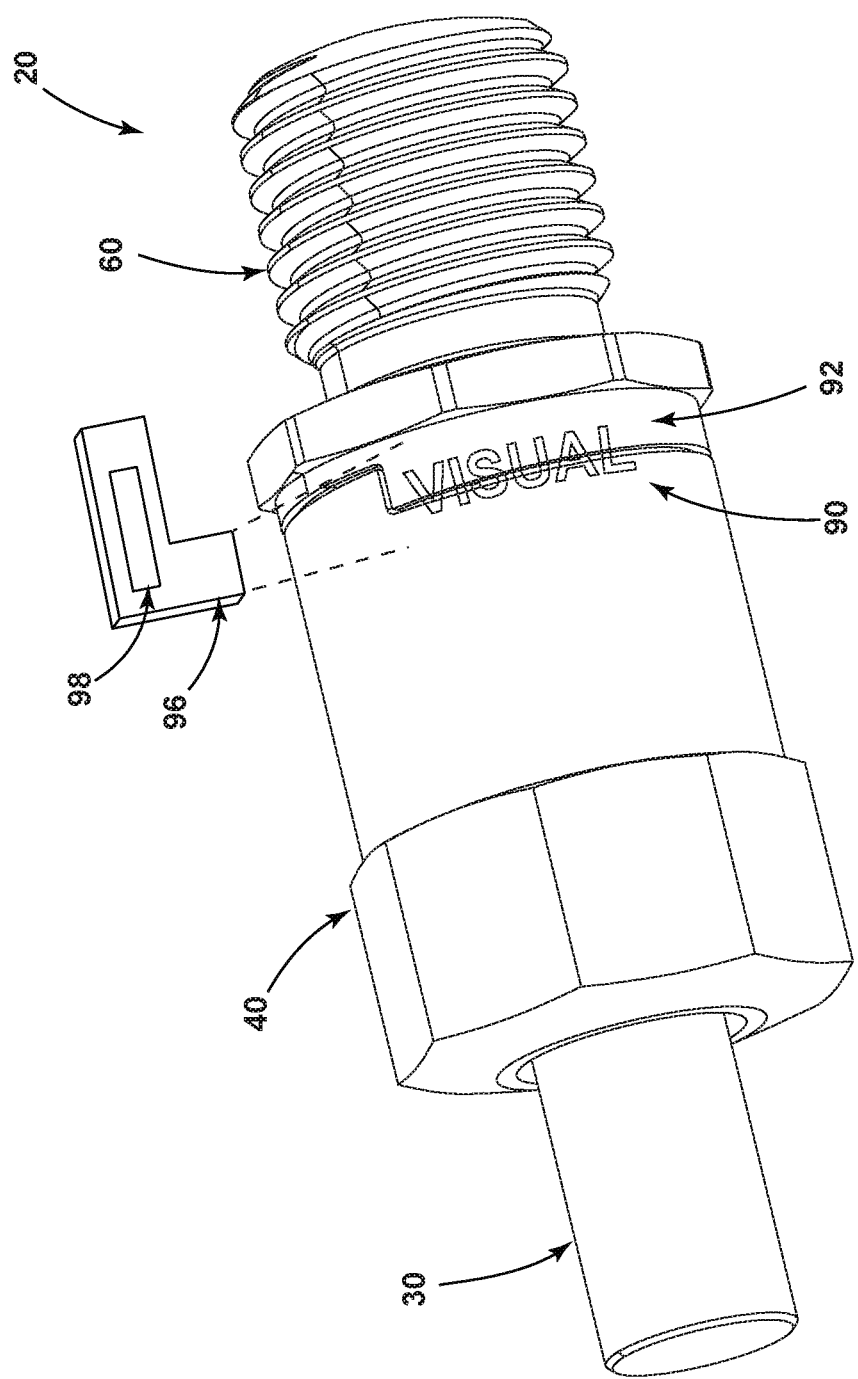
FIG. 8 is a perspective view generally illustrating embodiments of a fluid fitting and an electronic scanner according to teachings of the present disclosure.

With embodiments, a connection or engagement between stops, such as between a first stop 80 and a second stop 84, may provide a first visual indicator that a fluid fitting 20 is sufficiently connected. In embodiments, such as generally illustrated in FIGS. 7 and 8, a fitting 20 may include one or more additional (or alternative) visual indicators/markings that a fitting 20 is sufficiently connected. For example and without limitation, a nut 40 may include a first marking 90, and a union 60 may include a second marking 92 that may align (e.g., circumferentially) with each other if the nut 40 and the union 60 are sufficiently connected (e.g., are disposed in a connected configuration). In embodiments, one of the first marking 90 and the second marking 92 may include a greater circumferential extent than the other (e.g., first marking 90 may be configured as a line, second marking 92 may be configured as a second line, and the second line may be wider than the first line in a circumferential direction). A difference in circumferential extent between the first marking 90 and the second marking 92 may, for example, correspond to an expected or anticipated amount of deformation of the first stop 80 and/or the second stop 84 due upon a sufficient connection. A leading edge 94 of the larger marking (e.g., the second marking 92) may correspond to a design position/alignment for a sufficient connection. Due to deformation, for example, the nut 40 and the union 60 may be rotated relative to each other beyond a design position. In such circumstances, the smaller marking (e.g., the first marking 90) may not align with leading edge 94 of the larger marking, but may still be aligned with at least some portion of the larger marking, which may provide a visual indication that the connection is sufficient.

In embodiments, such as generally illustrated in FIGS. 7A-7D, a fluid fitting 20 may include various numbers of sets of markings 90, 92 (e.g., a set of markings may include a first marking 90 and a corresponding second marking 92). For example and without limitation, a fluid fitting 20 may include a single set of markings 90, 92 (see, e.g., FIG. 7A), two sets of markings 90, 92 (see, e.g., FIG. 7B), three sets of markings 90, 92 (see, e.g., FIG. 7C), four sets of markings 90, 92 (see, e.g., FIG. 7D), and/or other numbers of sets of markings 90, 92. For embodiments with multiple sets of markings 90, 92, the sets of markings 90, 92 may or may not be evenly spaced from each other. The first markings 90 may or may not have substantially the same circumferential extents as each other and/or as the second markings 92. Some or all of the markings 90, 92 may be substantially linear (e.g., may be lines, such as black lines) and/or aligned with an 20A of the fitting 20. Additionally, with embodiments, the alignment of markings may be associated or correlated to a set or desired position of threads that may be included with a fluid fitting.

Figure 7E:
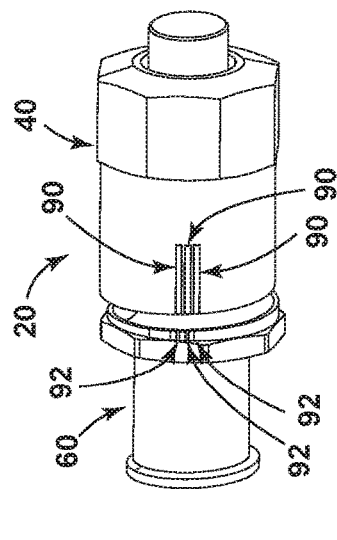
FIGS. 7E, 7G, and 7I are perspective views generally illustrating an embodiment of a fluid fitting in different positions according to teachings of the present disclosure.
Figure 7G:
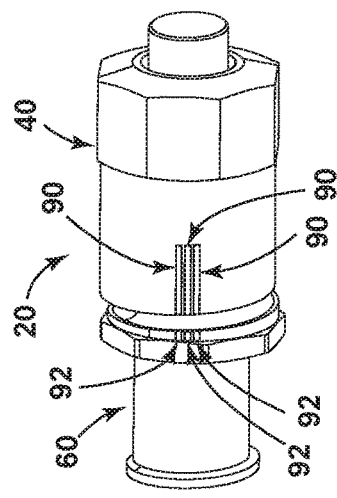
Figure 7I:
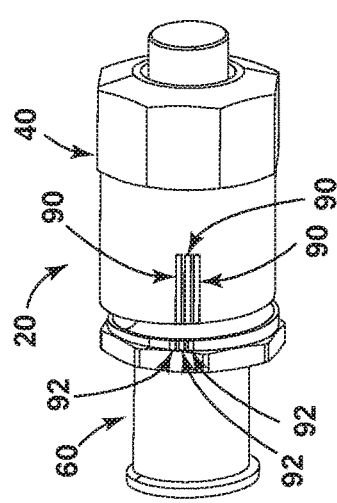
Figure 7F:
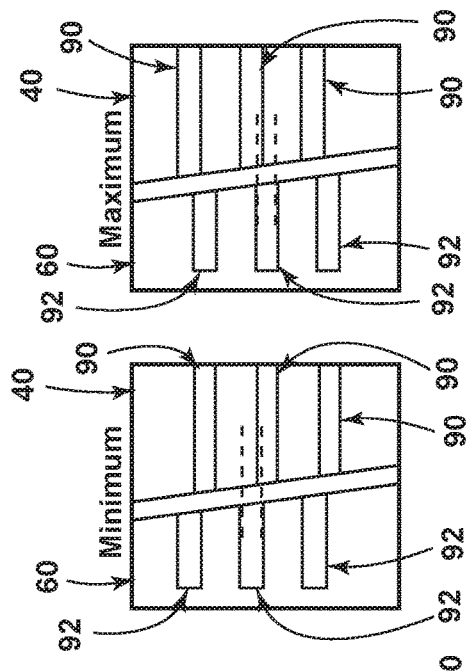
FIGS. 7F and 7H are enlarged representations of the markings of the embodiments of FIGS. 7E and 7G, respectively.
Figure 7H:
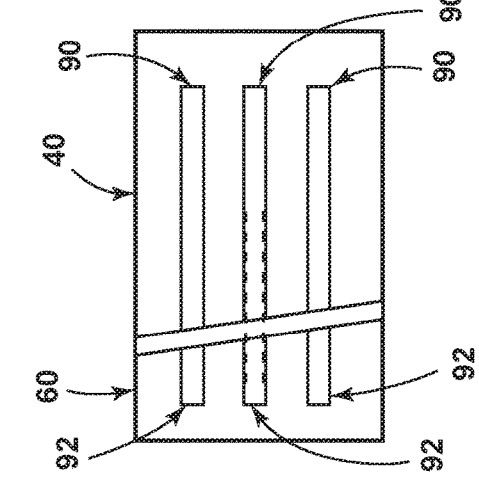
Figures 7J, 7K:
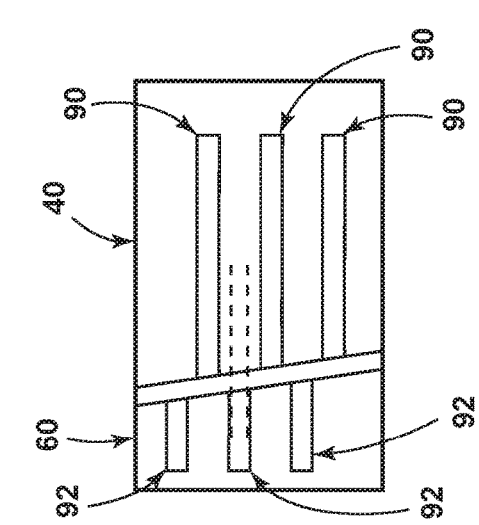
FIGS. 7J and 7K are enlarged representations of markings of an embodiment of a fluid fitting in a minimum connected position and in a maximum connected position according to teachings of the present disclosure.

In embodiments, such as generally illustrated in FIGS. 7E and 7F, in a disconnected position (e.g., an insufficient connection), some or all the first markings 90 may be offset and not overlap with the second markings 92. With a design position (e.g., a sufficient connection), such as generally illustrated in FIGS. 7G and 7H, each of the first markings 90 may be substantially or entirely aligned with the second markings 92. As generally illustrated in FIGS. 7I, 7J, and 7K a sufficient connection may be indicated even if the markings 90, 92 are partially but not entirely aligned, such as if the nut 40 and the union 60 are between minimum and maximum rotational positions for a sufficient connection. It is noted that, with embodiments, a gap (e.g., a 0.015 inch gap) may exist between a nut 40 and a union 60 with a completed and proper connection. Portions around or adjacent to the markings 90, 92 (e.g., a lighter "box" area) may also provide visual indication for a sufficient connection and/or may serve to provide added contrast or visual indication of a sufficient connection. The markings 90, 92 and/or portions around the markings 90, 92 may include varying colors that may differ from adjacent portions of the fitting 20 and/or that may match up with a corresponding component of the fitting 20. The markings 90, 92 may be provide in an area that may, for example and without limitation, be generally rectangular.

With embodiments, a range of expected deformation may be determined according to appropriate maximum and/or minimum limits (see, e.g., FIGS. 7J and 7K). Minimum limits may be determined according to an expected loss of pressure during an expected life of the fitting 20. An expect loss of pressure may, for example and without limitation, be a factor of repeated use, vibration, component tolerances, and/or temperature variation, among others. Maximum limits may be determined according to one or more of a maximum (or "excessive") torque and/or a torque at which galling occurs.

In embodiments, such as generally illustrated in FIG. 8, a first marking 90 and a second marking 92, when aligned, may provide a particular design, which may include or take the form of a word. For example and without limitation, the first marking 90 may include a first portion of a word (e.g., a bottom half of the word "VISUAL") and the second marking 92 may include a second portion of a word (e.g., a top half of the word "VISUAL"). An optical device 96 may be configured to read the word (e.g., via optical character recognition or OCR) to determine if a successful connection has been made.

Figure 8A:
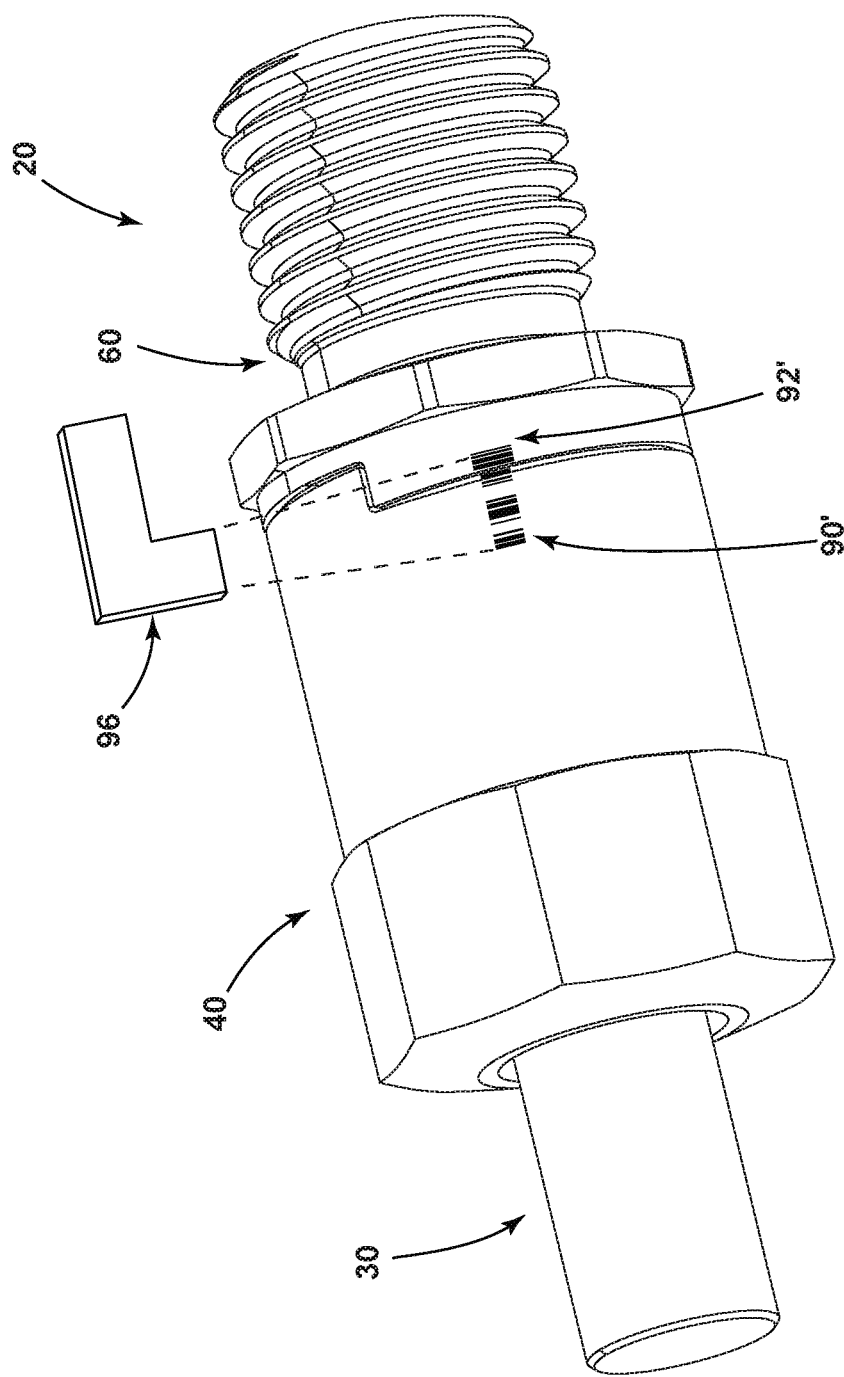
FIGS. 8A and 8B are perspective views generally illustrating embodiments of fluid fittings and electronic scanners according to teachings of the present disclosure.
Figure 8B:
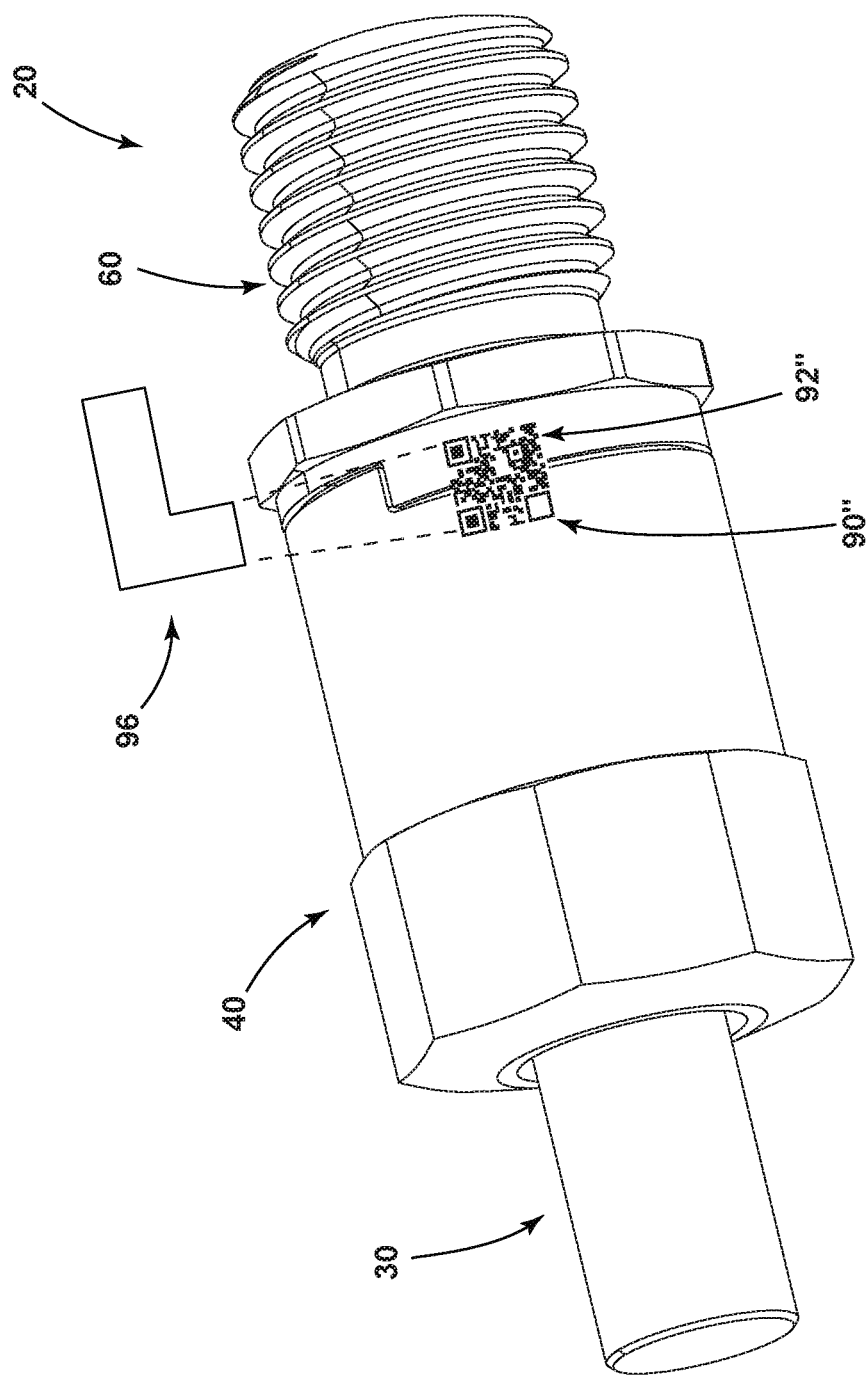

With embodiments, such as generally illustrated in FIGS. 8A, and 8B, a fluid fitting 20 may include markings (e.g., markings 90', 92', 90", 92") that may be configured to form a barcode or marking that may be readable via an optical device 96 (e.g., may be machine readable). For example and without limitation, markings 90', 92' may form a one-dimensional barcode upon a successful connection (see, e.g., FIG. 8A). One of markings 90', 92' may be longer than the other. As generally illustrated in FIG. 8B, a fluid fitting 20 may include markings 90", 92" that may form a two-dimensional barcode (e.g., a QR code) upon a successful connection.

Figure 9:
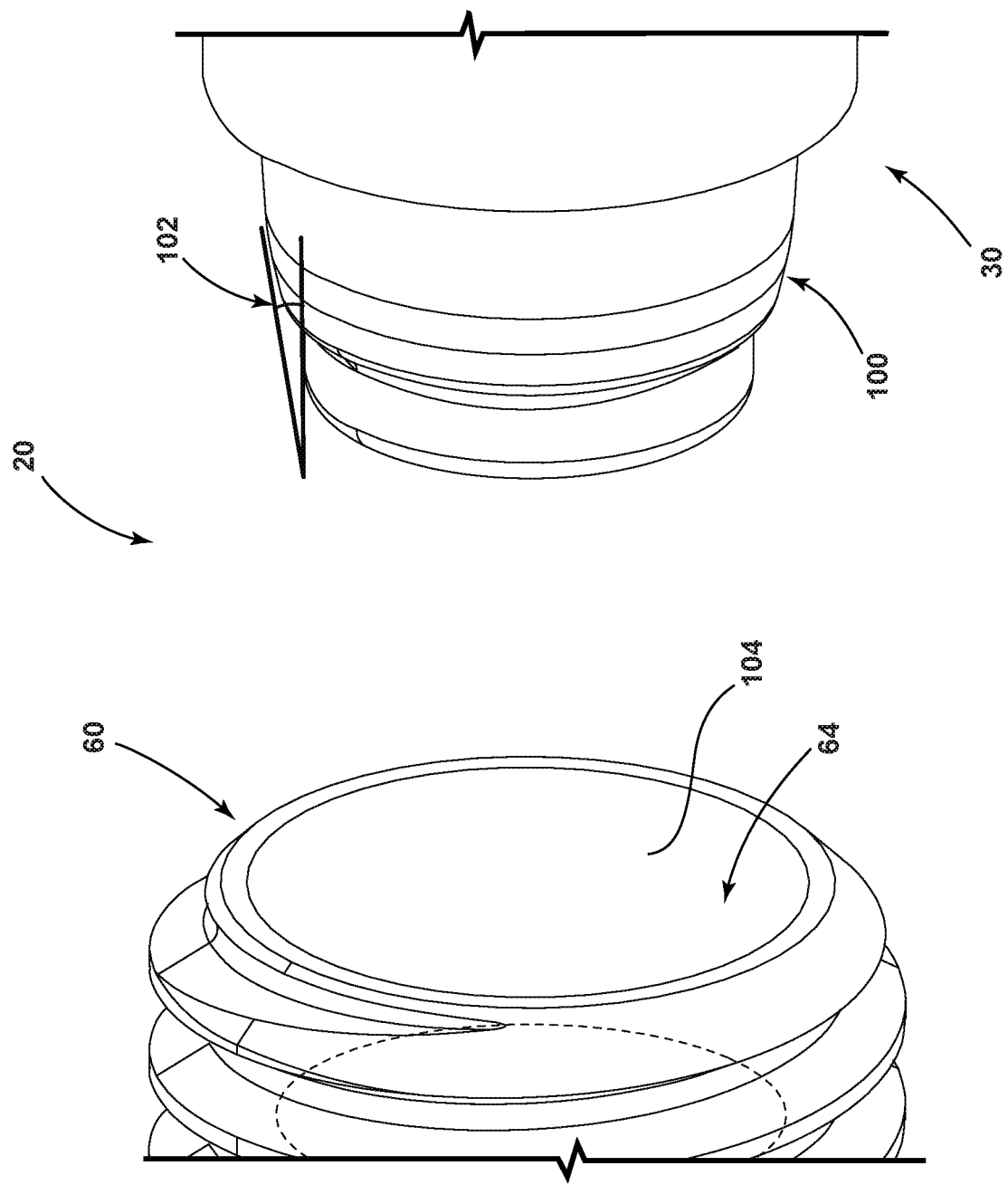
FIG. 9 is a perspective view generally illustrating portions of an embodiment of a fluid fitting according to teachings of the present disclosure.

In embodiments, such as generally illustrated in FIGS. 9 and 10, a sleeve 30 may include an outer mating surface 100 that may correspond to and/or engage an inner mating surface 104 of a union 60. The outer mating surface 100 may include an outer mating angle 102 (which may be provided relative to an axial direction). The inner mating surface 104 may include an inner mating angle 106 (which also may be provided relative to an axial direction). The outer mating angle 102 and the inner mating angle 106 may be about or substantially the same. In some design configurations, the outer mating angle 102 and/or the inner mating angle 106 may be about 12 degrees, such as, for example, about 10 degrees to about 14 degrees, about 11 degrees to about 13 degrees, or about 11.5 degrees to about 12.5 degrees. With embodiments, the outer mating angle 102 and/or the inner mating angle 106 may be greater or less than 12 degrees. For example and without limitation, the outer mating angle 102 and/or the inner mating angle 106 may be about 4 degrees to about 10 degrees, about 5 degrees to about 8 degrees, about 4 degrees to about 6 degrees, and/or about 5 degrees. Smaller mating angles may facilitate increased axial travel of the nut 40 and the union 60 between a minimum torque of a fluid fitting 20 and a maximum torque of a fluid fitting 20, which may, for example, accommodate for a greater range of manufacturing tolerances.

Figure 11A:
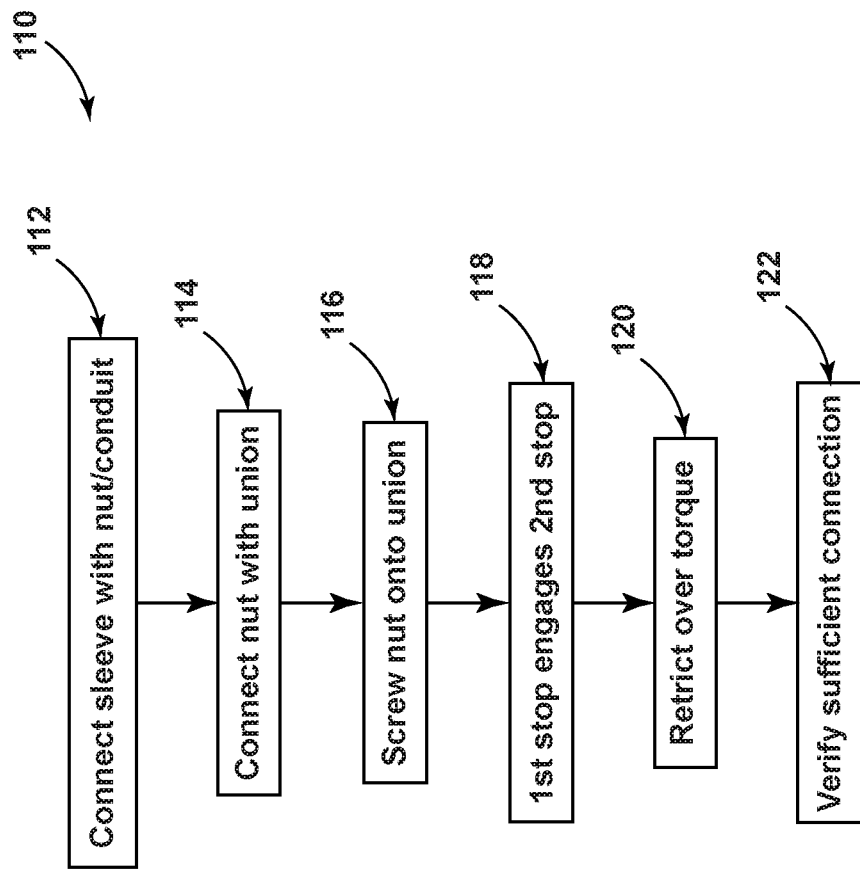
FIGS. 11A and 11B are flow diagrams generally illustrating embodiments of methods of operating a fluid fitting according to teachings of the present disclosure.

With reference to FIG. 11A, a method 110 of using/operating a fluid fitting 20 for some embodiments may include connecting a sleeve 30 with a fluid conduit 32 and/or connecting a sleeve 30 with a nut 40 (step 112). The nut 40 may be connected with (e.g., screwed onto) a union 60, which may connect and/or cause engagement between the sleeve 30 and the union 60 (step 114). The nut 40 and/or union 60 may be screwed together (step 116) until a first stop 80 (e.g., of the nut 40) engages/contacts a second stop 84 (e.g., of the union 60) (step 118). The first stop 80 and the second stop 84 may restrict and/or prevent further relative rotation of the nut 40 and the union 60 in a tightening direction (e.g., may restrict/prevent over-tightening/over-torqueing) (step 120). Contact between the first stop 80 and the second stop 84 may provide a visual indication of a sufficient connection between the nut 40 and the union 60 that may be verified (e.g., visually), such as by a user/inspector and/or without using a torque wrench or some other torque measuring/indicating device (step 122). Additionally or alternatively, a connection may be verified if the first markings 90 of the nut 40 align at least partially with second markings 92 of the union 60.

Additionally or alternatively, with embodiments, verifying a sufficient connection (step 122) may include scanning a fluid fitting 20 with an optical device 96 (see, e.g., FIGS. 8, 8A, and 8B). An optical device or scanner 96 (e.g., an electronic optical device or scanner) may include one or more of a variety of devices that may be configured to scan a fitting 20 to determine whether a sufficient connection has been made. For example and without limitation, an optical device 96 may include a camera, a scanner, a handheld scanner, a mobile scanner, a smartphone, a barcode reader, and/or other devices. Examples of optical devices 96 are sold by Cognex Corporation. In embodiments, an optical device 96 may be configured to scan a first stop 80 and a second stop 84 to determine if the first stop 80 and the second stop 84 are in contact with each other and that a sufficient connection has been made. Additionally or alternatively, an optical device 96 may be configured to scan an indicator or marking (e.g., markings 90, 90', 90", 92, 92', 92") to determine if a successful connection has been made. For example and without limitation, if the indicators or markings are configured as lines (e.g., markings 90, 92), an optical device 96 may be configured to determine if the lines are aligned, which may indicate that a successful connection has been made. If the indicator or markings are configured as a barcode (e.g., markings 90', 90", 92', 92"), an optical device 96 may scan a fluid fitting 20 and attempt to read the barcode.

With embodiments, if a fluid fitting 20 is not sufficiently connected, the optical device 96 may not be able to read the barcode and/or the optical device 96 may provide an indication of an insufficient connection. An indication of an insufficient connection may include, for example and without limitation, an audible warning and/or a warning message that may be displayed on a display 98 of the optical device 96, among other types of indications.

Figure 11B:
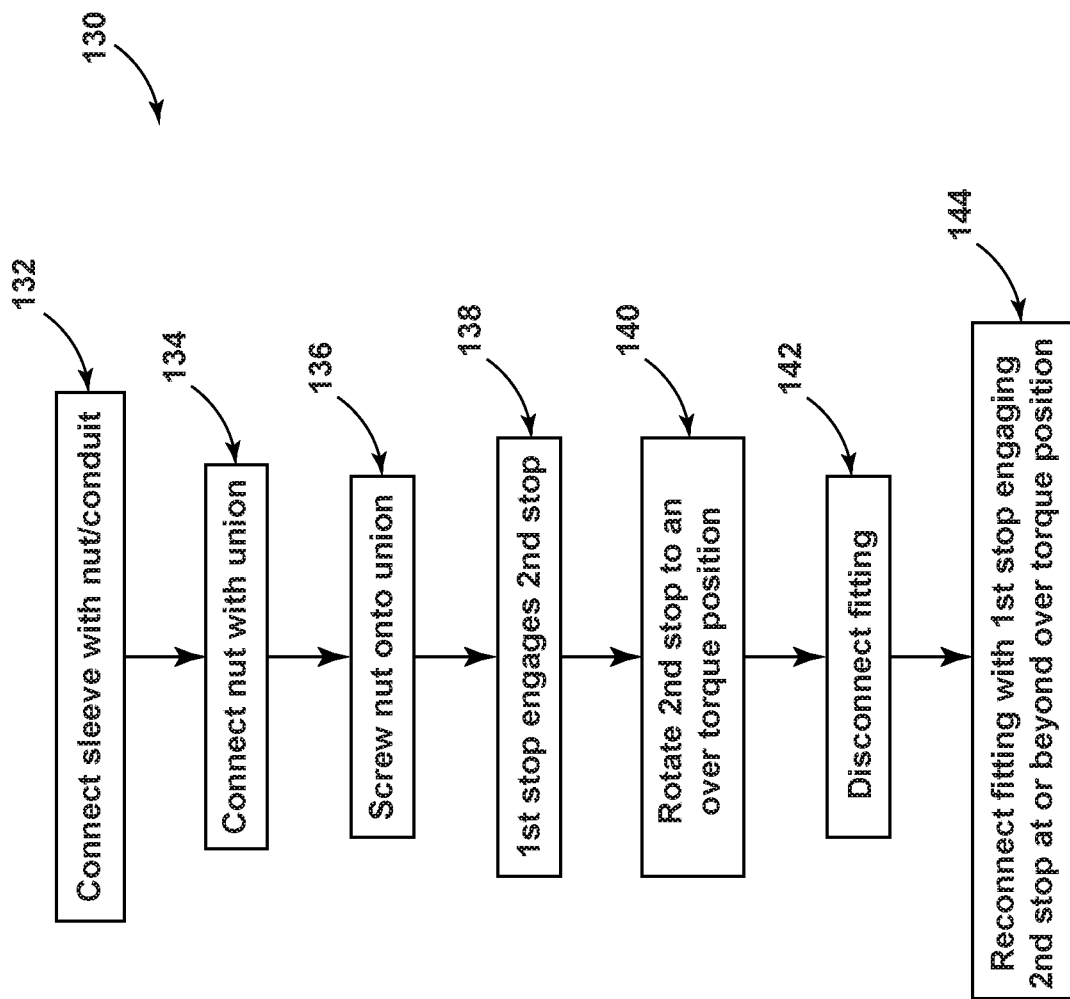

With reference to FIG. 11B, a method 130 of using/operating a fluid fitting 20 with a sliding stop (e.g., with a stop ring 88) may, for some embodiments, include connecting a sleeve 30 with a conduit 32 and/or a nut 40 (step 132). The method 130 may include connecting a nut 40 with a union 60 (step 134). The nut 40 and the union 60 may be screwed together (step 136) until the first stop 80 and the second stop 84 engage each other (step 138). As generally illustrated in FIG. 5, if the nut 40 and the union 60 continue to be screwed together after the first stop 80 and the second stop 84 engage each other (e.g., if nut 40 and/or union 60 are over-torqued), a sliding stop may rotate (e.g., the second stop 84 and the stop ring 88 may rotate relative to the union 60) (step 140). The force or torque involved in causing the second stop 84 and the stop ring 88 to rotate may exceed a threshold value (or an initial threshold value). The threshold value may correspond to a maximum amount of force expected to be provided by a user without benefit of a mechanical advantage. For example and without limitation, rotating the second stop 84 beyond initial contact between the first stop 80 and the second stop 84 may involve a wrench or other tool.

With embodiments, connecting the nut 40 with the union 60 may include rotating at least one of the nut 40 and the union 60 until the nut and the nut 40 and the union are finger-tight. A mechanical device, such as a wrench, may then be used for further tightening. Once the connecting (e.g., rotating) of the nut 40 and the union 60 ceases, the second stop 84 may, if over-torqued, be disposed at a different angular position $AP_2$ than its initial position $AP_1$ relative to the union 60. The fluid fitting 20 may subsequently be disconnected (step 142). With future or subsequent connections between the nut 40 and the union 60, the same or a greater amount of rotation, torque, and/or axial force (e.g., over-torqueing) may be used to cause engagement between first stop 80 and second stop 84 (step 144). That is, even if the second stop 84 moves from an initial position $AP_1$, for example due to an associated deformation from connection, with subsequent connections the stop can ensure that the connection (with the second stop 84 at the subsequent position $AP_2$) is sufficient. An over-torque condition may be detected if at least one of the first markings 90 rotates beyond a corresponding one of the second markings 92 before the stop 80 of the nut 40 engages the stop 84 of the union 60.

Figure 12A:
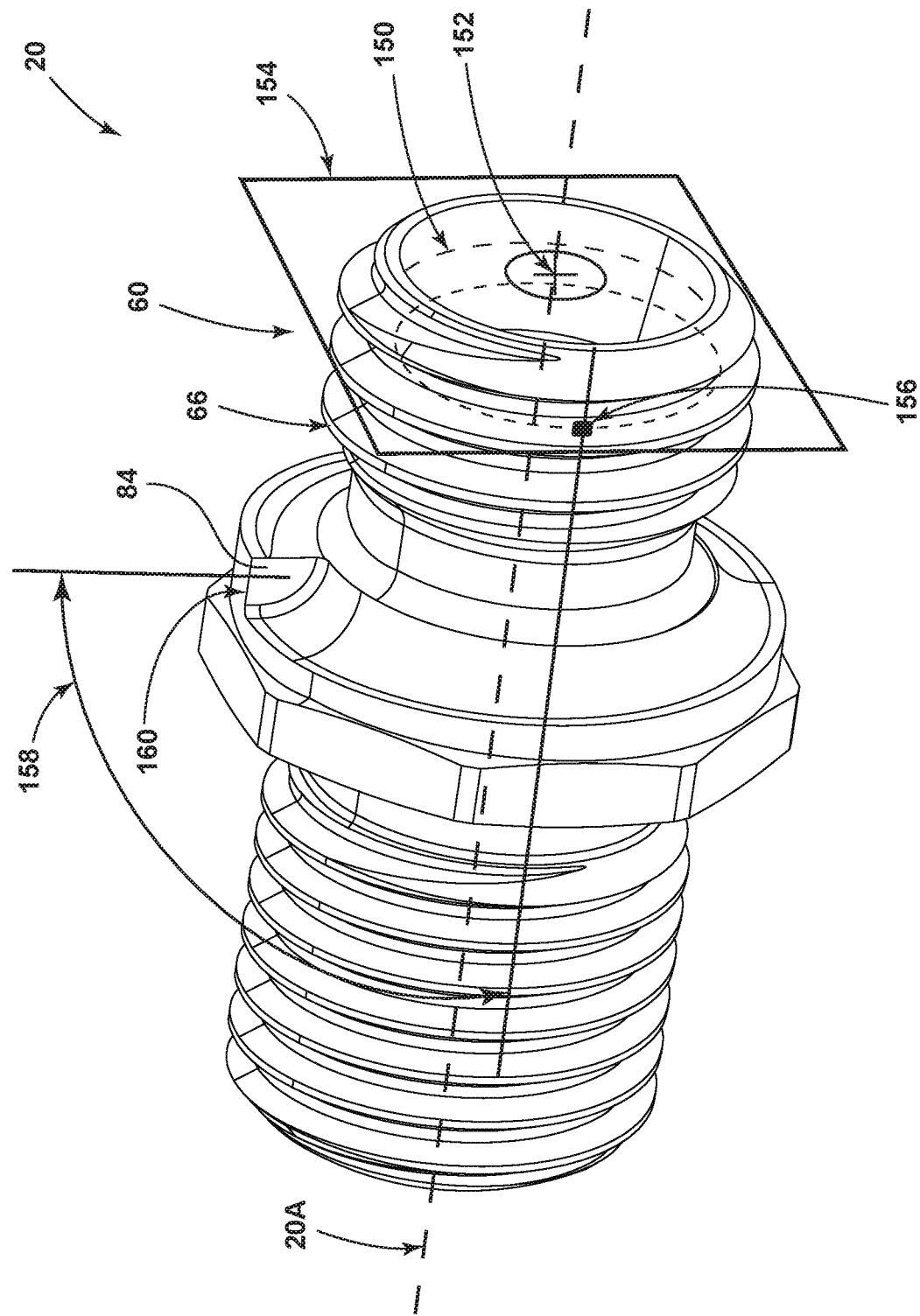
FIG. 12A is a perspective view generally illustrating an embodiment of a fluid fitting according to teachings of the present disclosure.
Figure 12B:
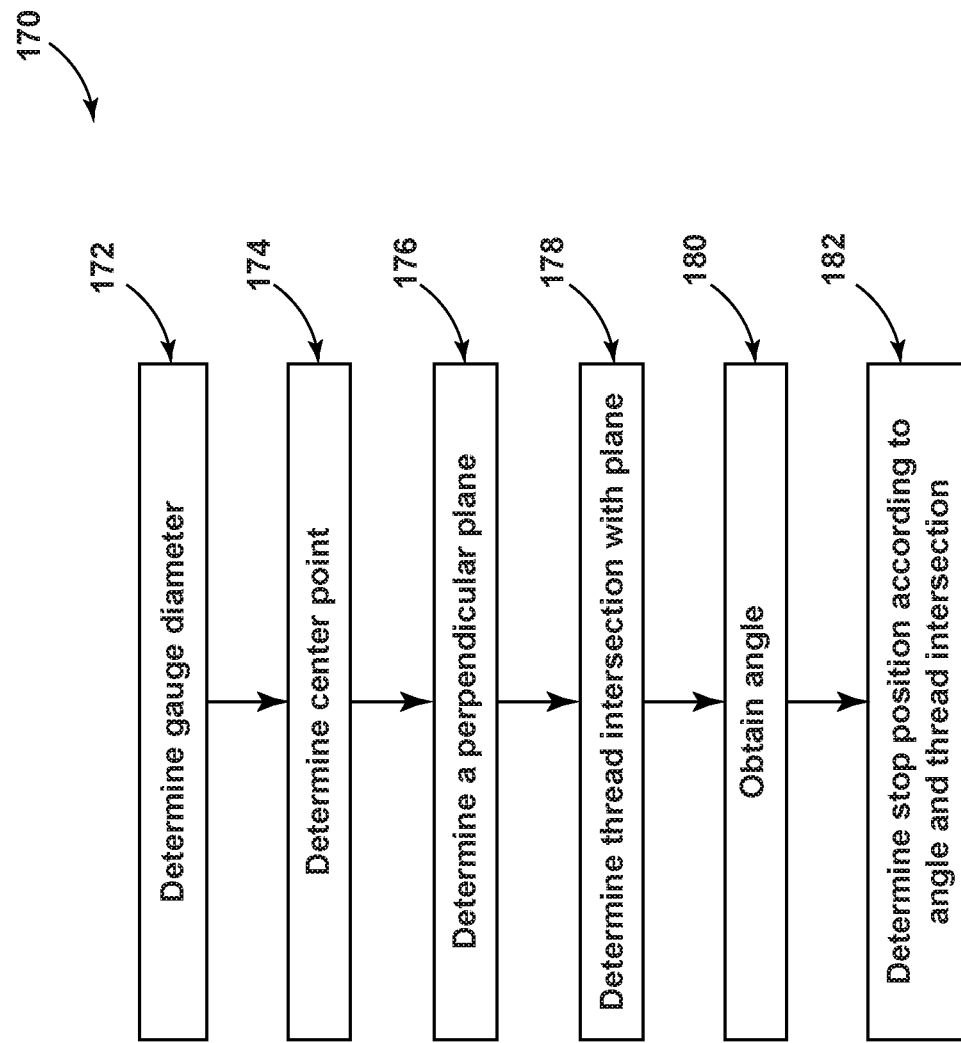
FIG. 12B is a flow diagram generally illustrating an embodiment of a method of designing a fluid fitting according to teachings of the present disclosure.

In embodiments, such as generally illustrated in FIGS. 12A and 12B, a method 170 of designing a fluid fitting 20 may include determining a gauge diameter 150 of a component, such as of a nut 40 and/or a union 60 (step 172). A center point 152 of the gauge diameter 150 may be identified or determined (step 174). A plane 154 perpendicular to an axis 20A of the fluid fitting 20 and that includes the center point 152 may be determined (step 176). An intersection point or area 156 where threads of the component (e.g., the threads 66 of a union 60) intersect with the perpendicular plane 154 may be determined (step 178). A stop angle 158 may be determined and/or obtained (step 180). A stop angle 158 may correspond to a desired or intended amount of relative rotation between two components, such as between a union 60 and a nut 40. A stop position 160 for a stop of the component (e.g., the second stop 84 of the union 60) may be determined according to stop angle 158 and point or area 156 (step 182). For example and without limitation, a stop position 160 may be disposed at the stop angle (e.g., angularly spaced) from point or area 156 in a clockwise direction or in a counterclockwise direction. A fitting 20 (e.g., a stop 84 of a union 60) may be formed according to the determined stop position.

In embodiments, a stop angle 158 may be determined according to an expected plastic deformation, an expected elastic deformation, and/or an expected amount of axial compression of fitting 20. A stop angle 158 may be larger if an expected plastic deformation, an expected elastic deformation, and/or an expected amount of axial compression are relatively large. A stop angle 158 may be smaller if an expected plastic deformation, an expected elastic deformation, and/or an expected amount of axial compression are relatively small. A tolerance of a stop angle 158 may, for example and without limitation, be about +/−15 degrees to about +/−30 degrees, and/or about +/−25 degrees (e.g., with respect to relative positions of two stop features).

While a union 60 is shown with outer threads 66, and a nut 40 is shown with inner threads 48, embodiments of a fitting 20 may include a union 60 including inner threads engaging outer threads of a nut 40.

The sleeve 30, the nut 40, and the union 60 are generally described and illustrated as discrete components. However, some or all of such components (or features thereof) could be associated with components having different names (with similar configurations and/or functionality) and/or may be integrated and/or connected with one or more other/additional components. For example and without limitation, as would be known to persons of skill in the art, various configurations of such components may comprise a joint, and geometries that are referred to on a sleeve and a union may, for example, be formed (e.g., directly machined) into complex fittings or other/additional components.

With embodiments, a fluid fitting 20, which may be configured as a flareless fitting, such as a AS18280 style fitting, that may be used in connection with aircraft. Such fittings 20 may include one or more features that may be desirable and/or better than other designs, such as, for example and without limitation, improved or superior electrical conductivity, temperature range/compatibility, fluid and environmental compatibility, and/or reusability. A sufficient or correct connection of a flareless fitting may involve an acceptable range of torque, such as according to Aerospace Recommended Practice (ARP) 908. Some methods of evaluating a connection (e.g., via a torque value) may be an indirect measurement approach.

Figure 13:
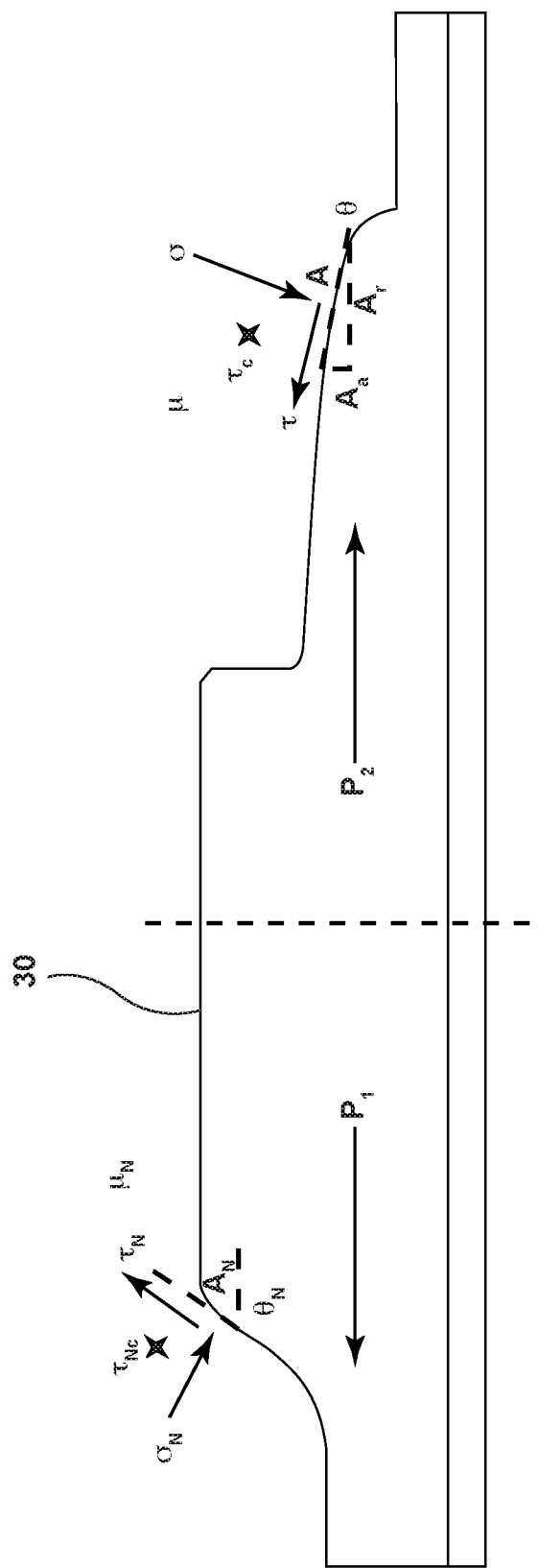
FIG. 13 is a cross-sectional view generally illustrating portions of an embodiment of a sleeve according to teachings of the present disclosure.

In embodiments, such as generally illustrated in FIG. 13, sealing of components of a fitting 20 (e.g., of a sleeve 30 and a union/adapter 60 and/or of a sleeve 30 and a nut 40) may be facilitated and/or accomplished via a normal stress or sealing pressure between mating adapters (e.g., between a sleeve 30 and a union/adapter 60). A lower acceptable limit for a sealing pressure may be determined or defined according to a maximum fluid pressure expected to be contained by the fitting 20. An upper acceptable limit may include a threshold at which galling may begin to occur.

In FIG. 13, in connection with contact between a sleeve 30 and a nut 40, $P_1$ may represent an axial force, $\sigma_N$ may represent a normal traction, $\tau_N$ may represent friction traction along $A_N$, $\tau_{NC}$ may represent fiction trance along a circumferential direction, $A_N$ may represent a sleeve-nut contact area, Ts may represent sleeve torque, and $r_{Nm}$ may represent mean torque radius at a sleeve-union contact. These values/variables may be related according to the following equations:

$$\tau_N = \varepsilon_N \sigma_N \qquad \text{Eq. 1}$$

$$\tau_{Nc} = \varepsilon_{Nc} \sigma_N \qquad \text{Eq. 2}$$

$$0 \leq (\varepsilon^2_N + \varepsilon^2_{Nc})^{1/2} \leq \mu_N \qquad \text{Eq. 3}$$

$$P_1 = A_N * B_N * \sigma_N * \sin(\varphi_N + \theta_N) \qquad \text{Eq. 4}$$

$$\tan \Phi_N = \varepsilon_N \qquad \text{Eq. 5}$$

$$B_N = (1 + \varepsilon_N^2)^{1/2} \qquad \text{Eq. 6}$$

$$T_S = \tau_c * A * r_{Nm} \qquad \text{Eq. 7}$$

$$\sigma_N = P_1 / (A_N * \sin \theta_N) \qquad \text{Eq. 8}$$

$$\tau_{Nc} = \mu_N * P_1 / (A_N * \sin \theta_N) \qquad \text{Eq. 9}$$

$$T_S = \mu_N * rN_m * P_1 / \sin \theta_N \qquad \text{Eq. 10}$$

$$\tau_c = (\mu_N / \sin \theta_N)(r_{Nm}/r_m) P_1 / A \qquad \text{Eq. 11}$$

$$\tau_c = \varepsilon_c \sigma \qquad \text{Eq. 12}$$

$$\varepsilon_c = (\mu_N / \sin \theta_N)(r_{Nm}/r_m)(1+\varepsilon^2)^{1/2} \sin(\varphi+\theta) \qquad \text{Eq. 13}$$

The following assumptions may be applied:

$$\varepsilon_N = 0 \qquad \text{Eq. 14}$$

$$\varepsilon_{Nc} = \mu_N \qquad \text{Eq. 15}$$

$$\varphi_N = 0 \qquad \text{Eq. 16}$$

$$B_N = 1 \qquad \text{Eq. 17}$$

In connection with contact between a sleeve 30 and a union 60, $\sigma$ may represent normal traction (e.g., sealing pressure), $\tau$ may represent friction traction along A, $\tau_C$ may represent friction traction along a circumferential direction, A may represent sleeve-union contact area, $A_r$ may represent a radial projection of A, $A_a$ may represent an axial projection of A, $k_r$ may represent a radial stiffness, $u_r$ may represent radial displacement, $u_a$ may represent axial displacement, $\alpha$ may represent nut angular rotation (e.g., in radians), $l_t$ may represent a nut thread lead, $T_s$ may represent a sleeve torque, $r_m$ may represent a mean torque radius at sleeve-union contact, $\sigma_r$ may represent radial stress, and $\sigma_a$ may represent axial stress. These values/variables may be related according to the following equations:

$$\sigma = \varepsilon \sigma \qquad \text{Eq. 18}$$

$$\tau_c = \varepsilon_c \sigma \qquad \text{Eq. 19}$$

$$0 \leq (\varepsilon^2 + \varepsilon^2_c)^{1/2} \leq \mu \qquad \text{Eq. 20}$$

$$P_2 = A * B * \sigma * \sin(\varphi+\theta) \qquad \text{Eq. 21}$$

$$\tan \Phi = \varepsilon \qquad \text{Eq. 22}$$

$$B = (1+\varepsilon^2)^{1/2} \qquad \text{Eq. 23}$$

$$\sigma_r = P_2 * \sin(\psi - \theta)/(A * \cos\theta * \sin(\varphi + \theta)) \quad \text{Eq. 24}$$

$$\sigma_a = P_2/(A * \sin\theta) \quad \text{Eq. 25}$$

$$\tan\psi = 1/\varepsilon \quad \text{Eq. 26}$$

$$\sigma_r = k_r * u_r/A_r \quad \text{Eq. 27}$$

$$u_r = u_a * \tan\theta \quad \text{Eq. 28}$$

$$u_a = l_t * \alpha/(2\pi) \quad \text{Eq. 29}$$

$$T_S = \tau_c * A * r_m \quad \text{Eq. 30}$$

$$\varepsilon^2 + \varepsilon_c^2 = \mu^2 \quad \text{Eq. 31}$$

$$\mu^2 - \varepsilon^2 = (\mu_N/\sin\theta_N)(r_{Nm}/r_m)(1+\varepsilon^2)^{1/2}\sin(\varphi+\theta) \quad \text{Eq. 32}$$

Equations 13 and 32 may be solved for ε. A radial stress $\sigma_r$, normal traction σ (sealing pressure), and/or an axial force $P_1$, $P_2$, may be determined for a given nut rotation and radial stiffness. In embodiments, $P_1$ may equal $P_2$. Equations 18 and 19 may be solved for friction tractions at a sleeve-union interface. Equation 7 and/or Equation 30 may be solved for a sleeve torque $T_s$. A nut torque $T_t$ due to threads may be determined, such as according to nut factor calculations. A total torque T may be represented as:

$$T = T_S + T_t \quad \text{Eq. 33}$$

A nut axial force Pt may be represented as:

$$P_t = K * T_t * d \quad \text{Eq. 34}$$

$T_t$ may represent a nut torque, K may represent a nut factor, and/or d may represent a nut average diameter. Nut factor K may include one or more effects of nut geometry as well as friction. During tightening, $P_t$ may equal $P_1$ or $P_2$ (which may be equal). During pressurization, $P_t$ may be different than $P_1$ or $P_2$.

One more assumptions may apply. For example and without limitation, it may be assumed that contact always occurs at constant angle and constant area, all tractions and stresses in sleeve nose are constant over area, interior shear stresses are negligible, radial stiffness is independent of angle, radial stiffness is uncoupled from other stiffness, union deformation is negligible (so radial displacement may be dictated by geometry $u_r = u_a * \tan(\theta)$), axial deformation of the sleeve 30 is negligible (so the sleeve 30 travels with the nut 40 like a rigid body $u_a = (l_t/2*\pi)*\alpha$), a slip condition is present at the sleeve-nut bearing contact, frictional forces act only in the circumferential direction (which may be verified by finite element analysis or FEA), and/or a slip condition is present at the sleeve-union interface.

With some torque-based connection methods, a torque value may be related to an acceptable sealing pressure. In embodiments of methods of the present disclosure, a sealing pressure may be predicted. A relationship including all of the geometry of the mating components may be relatively complicated (e.g., as described above), but may be simplified to Equation 34. Axial force $P_t$ may be related to sealing pressure, such as via a geometrical relationship. A relatively small variation in friction can have a relatively significant effect on sealing pressure. For example and without limitation, a stainless steel −4 fitting may be torqued to a minimum ARP 908 value of 135 in-lbs (15.25 Nm) with minimal lubrication and may have as low as 34,224 psi (236 MPa) of sealing pressure at the location of the gage point. Additionally or alternatively, that same connection with ideal lubrication may be torqued to a maximum allowable torque of 190 in-lbs (21.47 Nm) and may have as much as 175,547 psi (1210 MPa) of sealing pressure at the gage point, which may correspond to variation in excess of 100 ksi between connections.

With embodiments of the present disclosure, a desired sealing pressure may be maintained via control of a position of a nut 40 (e.g., rather than via torque values). Controlling a position of a nut 40 may include determining an appropriate lower specification limit (LSL), determining an appropriate upper specification limit (USL), determining manufacturing capabilities (e.g., associated with nut position placement), and/or determining inspection capabilities (e.g., associated with nut position placement).

In embodiments, an LSL may be determined according to one or more factors, such as component tolerances, temperature variation, repeated connections, and/or vibration. Increases in these factors may negatively impact sealing pressure. A minimum allowable sealing pressure (e.g., a theoretical minimum) may be determined as an LSL for nut position as one or more of these factors are evaluated and/or quantified.

In embodiments, a USL for nut position may be determined such that a torque involved to achieve a desired position may not exceed that of a typical or expected connection. A USL may be sufficiently low that galling may not occur and/or may be relatively insignificant.

With embodiments, fittings 20 may be designed to be compatible with conditions more severe than expected conditions, such as four times more severe than design operating pressure conditions.

In embodiments, a method of manufacturing and inspecting/verifying a fitting 20 may include directly dimensioning an axial position or angle of a gage point relative to thread position. The axial position of the gage point may be inspected, such as, for example and without limitation, via CMM (coordinate measuring machine) touch-probe technology and/or a CMM touch-probe machine. Embodiments of methods may include tightening tolerances.

Some methods of dimensioning/tolerancing may not be configured to establish proper nut positioning. For example and without limitation, with some methods, tolerance stack-ups may result in a variation of nut position in excess of one complete rotation.

In embodiments, angular stop position on a nut 40 and/or a union 60, in combination with a length of a sleeve 30, may control and/or dictate variation in nut position. As each component of a fitting 20 is designed, manufacturing and/or inspection capabilities may be evaluated (e.g., for compatibility with nut-position control methods). If manufacturing is not adequate for determined performance limits, one or more geometry changes may be made to the fitting 20 to influence the change of sealing pressure of the fitting 20 per turn of the nut 40. Geometry changes may include, for example and without limitation, (i) changes to a radius of a sealing surface, which may change a footprint at a gage point (a relatively small change in radius may provide a relatively large change in the sealing surface), (ii) changes to thread pitch, and/or (iii) changes to the inner diameter and/or outer dimeter of fitting components, which may change the stiffness of the fitting 20 (e.g., effectively a spring rate of the fitting system).

Figure 14:
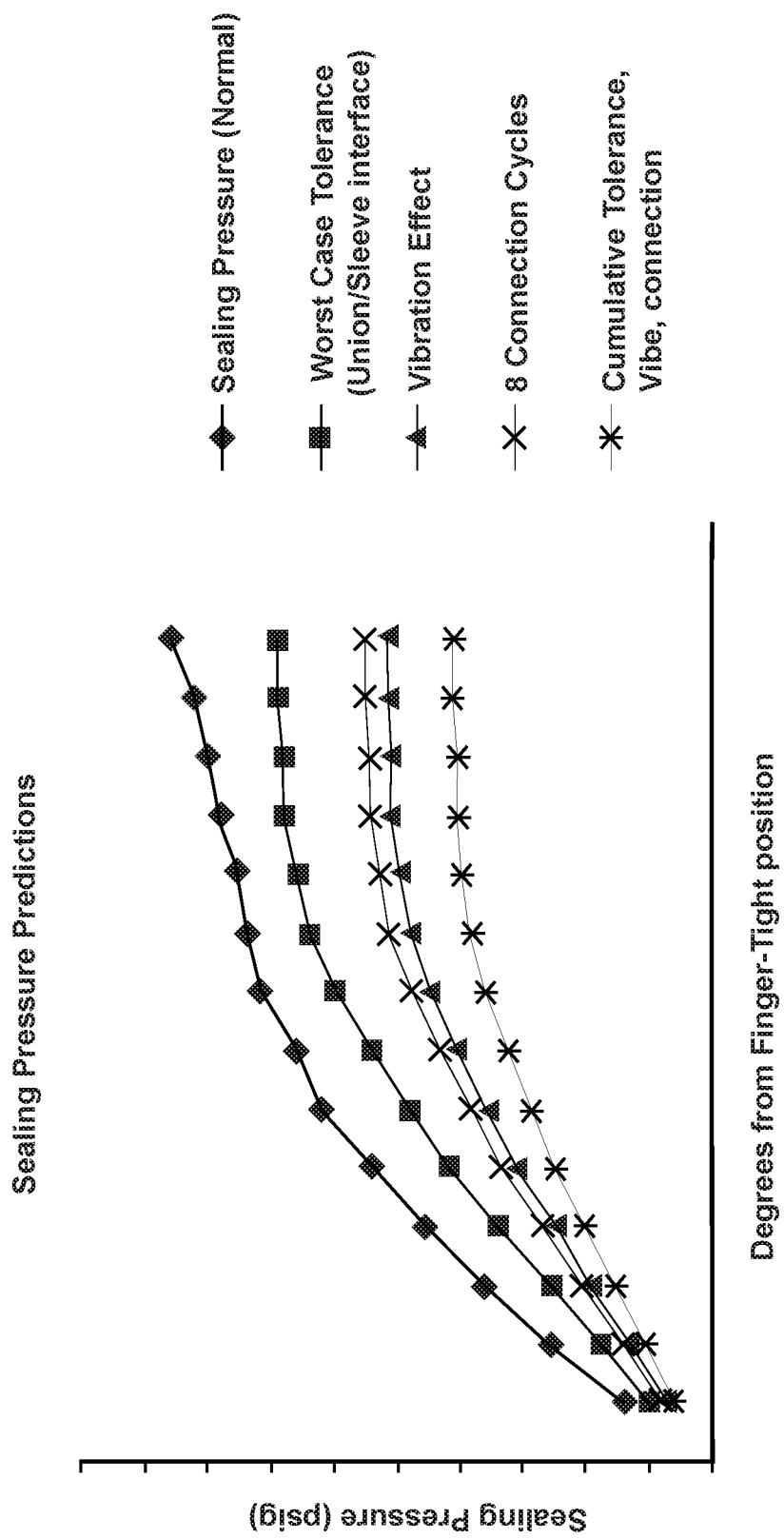
FIG. 14 is a graphical representation of sealing pressure relative to degrees from a finger-tight position.

FIG. 14 is graphical representation of sealing pressure relative to degrees from finger-tight position.

Figure 15:
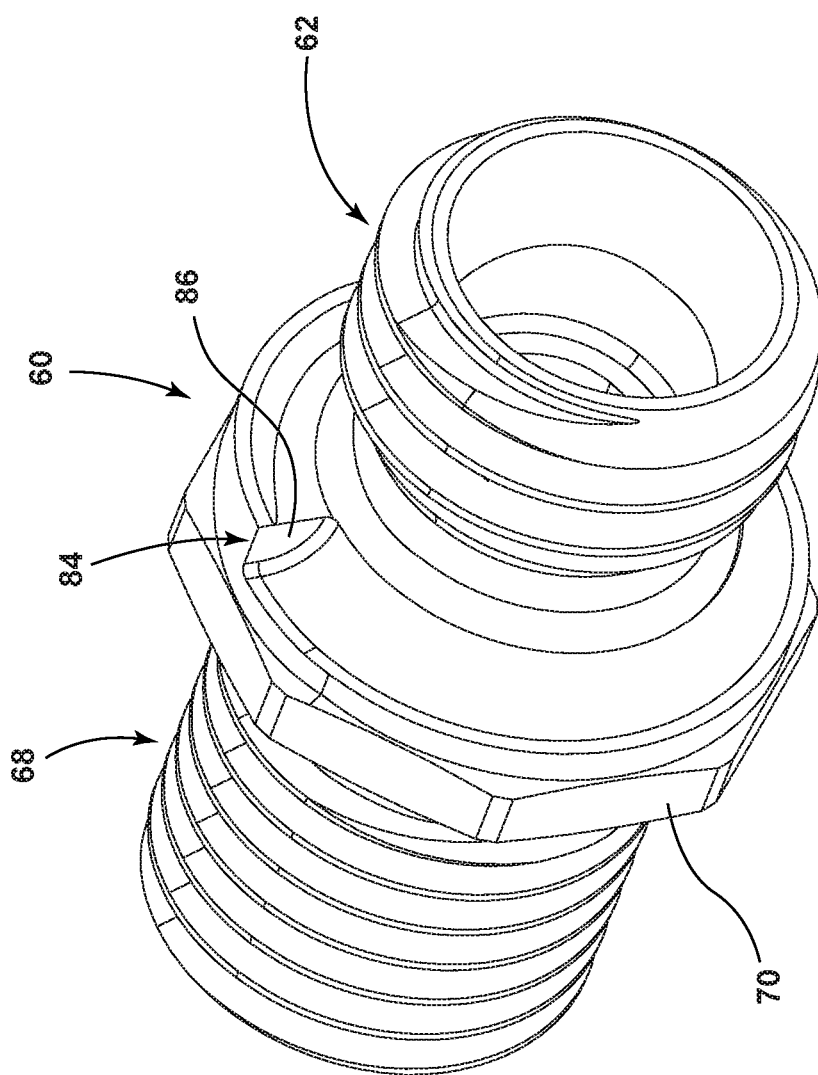
FIG. 15 is a perspective view generally illustrating an embodiment of a union according to teachings of the present disclosure.

FIG. 15 is a perspective view generally illustrating an embodiment of an adapter or union 60.

Figure 16:
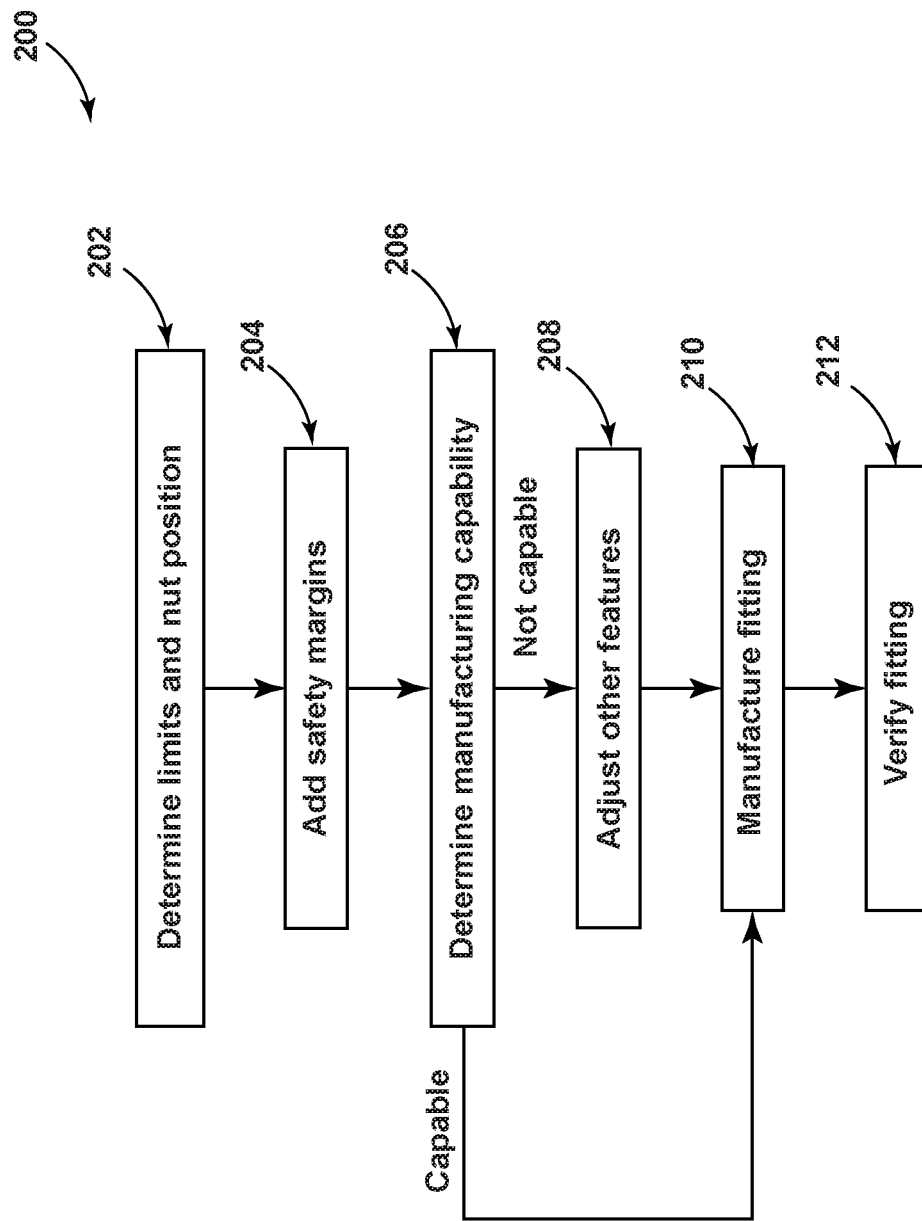
FIG. 16 is a flow diagram generally illustrating an embodiment of a method of designing, manufacturing, and/or verifying a fitting according to teachings of the present disclosure.

With embodiments, such as generally illustrated in FIG. 16, a method 200 of designing, manufacturing, and/or verifying a fitting 20 may include determining desired sealing pressure and/or limits for nut position (step 202). Safety margins may be added to compensate for factors such as repeated use and vibration (step 204). Whether manufacturing technology is compatible with the designed fitting may be determined (step 206). If manufacturing is not adequate for determined performance limits, one or more geometry changes may be made to the fitting 20 (step 208). If manufacturing technology is compatible, the fitting 20 may be manufactured (step 210), such as without adjusting other features of the fitting 20. Verification testing may be performed (step 212), which may address one or more specifications, such as the AS18280 specification and/or the RTCA (Radio Technical Commission for Aeronautics) DO-160 specification. Verification testing may include one or more of repeated assembly (e.g., increased cycle count and increased pressure evaluation), flexure, impulse, burst, vibration, lighting, sand/dust, and/or icing testing. Testing may continue until failure, such as to determine statistical robustness.

In embodiments, one or more components of a fitting 20 may be manufactured or formed with advanced machining methods and/or thread timing. With embodiments, a total tolerance stack of a fitting 20 may be about +/−0.003 inches, compared with other fittings that may include a total tolerance stack of about +/−0.038 inches. It may be desirable for relative axial travel to exceed a tolerance stack. Relative axial movement of components of a fitting 20 may exceed 0.003 inches. One or more wear resistant coatings may be applied to one or more components of a fitting 20, such as to limit or prevent galling.

With embodiments, one or more components of a fitting 20, such as a sleeve 30, a nut 40, and/or a union 60 may, for example and without limitation, be metal. Connecting a sleeve 30 with a union 60 may include forming a metal-to-metal fluid seal between the sleeve 30 and the union 60.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A fluid fitting, comprising:
a nut;
a sleeve; and
a union;
wherein the union includes a stop and the nut includes a stop, together comprising corresponding stops, and the union and the nut include corresponding markings configured to provide a visual indication of a connection of the nut with the union; the markings of the union and the nut each has a thickness, and the thicknesses define a difference between a minimum rotational position and a maximum rotational position of the union relative to the nut in which the nut and the union are connected; and wherein a first circumferential edge of the markings corresponds to the minimum rotational position, and a second circumferential edge of the makings indicates the maximum rotational position.

2. The fluid fitting of claim 1, wherein the corresponding stops contact or engage with each other when the nut is connected with the union.

3. The fluid fitting of claim 1, wherein the corresponding markings include a first marking disposed on the nut and a second marking disposed on the union.

4. The fluid fitting of claim 3, wherein the first marking and the second marking include substantially equal circumferential extents.

5. The fluid fitting of claim 1, wherein the corresponding markings include a plurality of first markings disposed on the nut and a plurality of second markings disposed on the union.

6. The fluid fitting of claim 5, wherein the plurality of first markings includes at least three first markings.

7. The fluid fitting of claim 5, wherein the plurality of first markings includes four first markings.

8. The fluid fitting of claim 5, wherein the plurality of second markings includes four second markings.

9. The fluid fitting of claim 5, wherein the plurality of first markings are substantially aligned with an axis of the fluid fitting.

10. The fluid fitting of claim 5, wherein in a first position, the plurality of first markings are offset from the plurality of second markings in at least a circumferential direction.

11. The fluid fitting of claim 10, wherein in a second position, the plurality of first markings are at least partially aligned with the plurality of second markings in the circumferential direction.

12. The fluid fitting of claim 6, wherein the plurality of first markings are equally-spaced from each other.

13. The fluid fitting of claim 1, wherein a difference in circumferential extents of the corresponding markings corresponds to an expected amount of deformation.

14. The fluid fitting of claim 1, wherein the corresponding markings comprise black lines.

15. The fluid fitting of claim 1, wherein an alignment of corresponding markings is associated or correlated with a position of threads.

16. The fluid fitting of claim 1, wherein in the minimum rotational position, a gap exists between the nut and the union.

17. The fluid fitting of claim 16, wherein the gap is about 0.015 inches.

18. The fluid fitting of claim 1, wherein the maximum rotational position corresponds to an over-torque condition if at least one of the first markings rotates beyond a corresponding one of the second markings before the stop of the nut engages the stop of the union.

19. A method of connecting a fitting, the method comprising:
   connecting a sleeve of the fitting with a nut of the fitting;
   connecting the nut with a union;
   rotating at least one of the nut and the union until a stop of the nut engages a stop of the union;
   restricting over torque via the stop of the nut and the stop of the union; and
   verifying a connection if first markings of the nut align at least partially with second markings of the union;
   wherein the first markings of the nut and the second markings of the union each has a thickness, and the thicknesses define a difference between a minimum rotational position and a maximum rotational position of the union relative to the nut in which the nut and the union are connected; and wherein a first circumferential edge of the markings corresponds to the minimum rotational position, and a second circumferential edge of the makings indicates the maximum rotational position.

20. The method of claim 19, wherein rotating at least one of the nut and the union includes rotating the at least one of the nut and the union manually until a finger-tight position is reached and then rotating the at least one of the nut and the union via a mechanical device until the stop of the nut contacts the stop of the union.

21. The method of claim 19, wherein the first markings and the second markings include corresponding lines.

* * * * *